United States Patent
Alderson

(10) Patent No.: US 12,446,578 B2
(45) Date of Patent: Oct. 21, 2025

(54) ANTIMICROBIAL COMPOSITIONS CONTAINING PEROXYPHTHALIC ACID AND/OR SALT THEREOF

(71) Applicant: VIROX TECHNOLOGIES INC., Oakville (CA)

(72) Inventor: Faraz Ahmadpour Alderson, Oakville (CA)

(73) Assignee: VIROX TECHNOLOGIES INC., Oakville (CA)

(*) Notice: Subject to any disclaimer, the term of this patent is extended or adjusted under 35 U.S.C. 154(b) by 462 days.

(21) Appl. No.: 17/771,635

(22) PCT Filed: Feb. 8, 2021

(86) PCT No.: PCT/IB2021/051004
§ 371 (c)(1),
(2) Date: Apr. 25, 2022

(87) PCT Pub. No.: WO2021/161148
PCT Pub. Date: Aug. 19, 2021

(65) Prior Publication Data
US 2022/0400671 A1    Dec. 22, 2022

Related U.S. Application Data

(60) Provisional application No. 62/972,344, filed on Feb. 10, 2020.

(51) Int. Cl.
| | | |
|---|---|---|
| *A01N 31/02* | (2006.01) | |
| *A01N 37/02* | (2006.01) | |
| *A01N 37/06* | (2006.01) | |
| *A01N 37/10* | (2006.01) | |
| *A01N 37/16* | (2006.01) | |
| *A01N 37/36* | (2006.01) | |
| *A01N 57/12* | (2006.01) | |
| *A01N 59/02* | (2006.01) | |
| *A01N 59/06* | (2006.01) | |
| *A01N 59/16* | (2006.01) | |
| *A01N 59/20* | (2006.01) | |
| *A01N 59/26* | (2006.01) | |

(52) U.S. Cl.
CPC ............ *A01N 37/06* (2013.01); *A01N 37/10* (2013.01); *A01N 37/16* (2013.01); *A01N 37/36* (2013.01); *A01N 59/06* (2013.01); *A01N 59/16* (2013.01); *A01N 59/26* (2013.01)

(58) Field of Classification Search
None
See application file for complete search history.

(56) References Cited

U.S. PATENT DOCUMENTS

| | | |
|---|---|---|
| 4,073,902 A | 2/1978 | Scartazzini et al. |
| 4,399,131 A | 8/1983 | Durckheimer et al. |
| 4,822,512 A | 4/1989 | Auchincloss |
| 4,990,329 A | 2/1991 | Sampathkumar |
| 5,085,852 A | 2/1992 | Banks |
| 5,872,111 A | 2/1999 | Au et al. |
| 6,099,587 A | 8/2000 | Scialla et al. |
| 6,211,213 B1 | 4/2001 | El A'mma |
| 6,593,283 B2 | 7/2003 | Hei et al. |
| 6,639,070 B1 | 10/2003 | Hamprecht et al. |
| 6,828,295 B2 | 12/2004 | Deak et al. |
| 6,884,868 B1 | 4/2005 | Tojo et al. |
| 7,204,931 B2 | 4/2007 | Martin et al. |
| 7,879,787 B2 | 2/2011 | Heintz et al. |
| 8,034,766 B2 | 10/2011 | Croud et al. |
| 8,431,526 B2 | 4/2013 | Croud et al. |
| 8,545,715 B1 | 10/2013 | Wang et al. |
| 8,697,140 B2 | 4/2014 | Arndt et al. |

(Continued)

FOREIGN PATENT DOCUMENTS

| | | |
|---|---|---|
| CA | 735490 | 5/1966 |
| CN | 106900707 | 6/2017 |

(Continued)

OTHER PUBLICATIONS

M.G.C. Baldry, "The antimicrobial properties of magnesium monoperoxyphthalate hexahydrate", Journal of Applied Bacteriology, 1984, 57, 499-503.

(Continued)

*Primary Examiner* — Brian Gulledge
(74) *Attorney, Agent, or Firm* — Millen, White, Zelano & Branigan, P.C.; Christopher W. Brody

(57) ABSTRACT

Environmentally-friendly, surface-compatible, non-malodorous, sporicidal compositions, in solid or liquid form, containing a peroxyphthalic acid and/or salt thereof in combination with a synergistic additive selected from one or more of the groups consisting of (i) formic acid, acetic acid, benzoic acid, diglycolic acid, furoic acid, glycolic acid, lactic acid, mandelic acid, phenylacetic acid, sulfamic acid, sulfosuccinic acid, and salts thereof; (ii) C6-C24 alkyl or aryl ether carboxylic acids and their salts, C8-C24 alkyl taurines and their salts, aryl taurines and their salts, alkoxylated C8-C24 alkyl phosphoric acid esters and their salts, and glycerol ethers; (iii) aromatic alcohols, C2-C8 linear or branched alcohols, dibasic esters, 2-pyrrolidone, butyl carbitol, butyl cellosolve, lactate esters, butyl-3-hydroxybutyrate, and triacetin; and (iv) antimicrobial metals. Aqueous embodiments have a pH of less than 6. Kits and methods of antimicrobial reduction relating to same are also disclosed.

26 Claims, 1 Drawing Sheet

(56) References Cited

U.S. PATENT DOCUMENTS

| | | |
|---|---|---|
| 8,865,226 B2 | 10/2014 | Bobbert |
| 8,999,399 B2 | 4/2015 | Lisowsky et al. |
| 9,655,838 B2 | 5/2017 | Prencipe et al. |
| 10,176,979 B2 | 1/2019 | Lieu et al. |
| 10,577,569 B2 | 3/2020 | Benie et al. |
| 10,781,408 B2 | 9/2020 | Oestergaard et al. |
| 10,844,360 B2 | 11/2020 | Gjermansen et al. |
| 2004/0097728 A1 | 5/2004 | Hamprecht et al. |
| 2004/0111806 A1 | 6/2004 | Scheper et al. |
| 2005/0271602 A1 | 12/2005 | Milanovich et al. |
| 2006/0014659 A1 | 1/2006 | Martin et al. |
| 2006/0057176 A1 | 3/2006 | Squire et al. |
| 2008/0076828 A1 | 3/2008 | Dalton et al. |
| 2008/0076829 A1 | 3/2008 | Dalton et al. |
| 2008/0199412 A1 | 8/2008 | Milanovich et al. |
| 2008/0206843 A1 | 8/2008 | Croud et al. |
| 2009/0099382 A1 | 4/2009 | Gerke et al. |
| 2009/0130739 A1 | 5/2009 | Burke et al. |
| 2011/0311510 A1 | 12/2011 | Croud et al. |
| 2012/0107415 A1* | 5/2012 | Lisowsky .............. A01N 59/20 514/557 |
| 2013/0324602 A1 | 12/2013 | Dalton et al. |
| 2015/0071904 A1 | 3/2015 | Collins et al. |
| 2016/0219883 A1* | 8/2016 | Squire .................. C11D 3/3942 |
| 2017/0173196 A1 | 6/2017 | Sherry et al. |
| 2018/0369087 A1 | 12/2018 | Dogo-Isonagie et al. |
| 2019/0048291 A1 | 2/2019 | Gori et al. |
| 2019/0133125 A1 | 5/2019 | Wiethan et al. |
| 2019/0302071 A1 | 10/2019 | Jang et al. |
| 2020/0002692 A1 | 1/2020 | Oestergaard et al. |
| 2020/0095225 A9 | 3/2020 | Ombrato et al. |
| 2020/0109352 A1 | 4/2020 | Vejborg et al. |
| 2020/0325461 A1 | 10/2020 | Oestergaard et al. |
| 2020/0362272 A1 | 11/2020 | Beier et al. |
| 2022/0054378 A1 | 2/2022 | Pillai et al. |

FOREIGN PATENT DOCUMENTS

| | | | |
|---|---|---|---|
| DE | 19835064 | 2/2000 | |
| EP | 0096525 | 12/1983 | |
| EP | 0133354 | 2/1985 | |
| EP | 0364559 | 9/1995 | |
| EP | 0 818 950 | 1/1998 | |
| EP | 0 824 347 | 2/1998 | |
| EP | 0 940 081 | 9/1999 | |
| EP | 0 998 912 | 5/2000 | |
| EP | 1 095 663 | 5/2001 | |
| EP | 1255573 | 11/2002 | |
| EP | 1056827 | 8/2003 | |
| EP | 1 447 100 | 8/2004 | |
| EP | 1491621 | 10/2014 | |
| EP | 3510867 | 7/2019 | |
| FR | 2691902 | 12/1993 | |
| GB | 2110259 | 6/1983 | |
| GB | 2137882 | 10/1984 | |
| WO | 1996/002624 | 2/1996 | |
| WO | 01/60421 | 8/2001 | |
| WO | 2001/097610 | 12/2001 | |
| WO | 2007/023481 | 3/2007 | |
| WO | WO-2007023481 A1 * | 3/2007 | ............. A01N 59/08 |
| WO | 2012/140413 | 10/2012 | |
| WO | 2014/138568 | 9/2014 | |
| WO | 2020/002692 | 1/2020 | |
| WO | 2020/070011 | 4/2020 | |
| WO | 2020/070209 | 4/2020 | |
| WO | 2020/0207944 | 10/2020 | |

OTHER PUBLICATIONS

A.D. Russel, "Bacterial Spores and Chemical Sporicidal Agents", Clinical Microbiology Reviews, Apr. 1990, p. 99-119, vol. 3, No. 2.

* cited by examiner

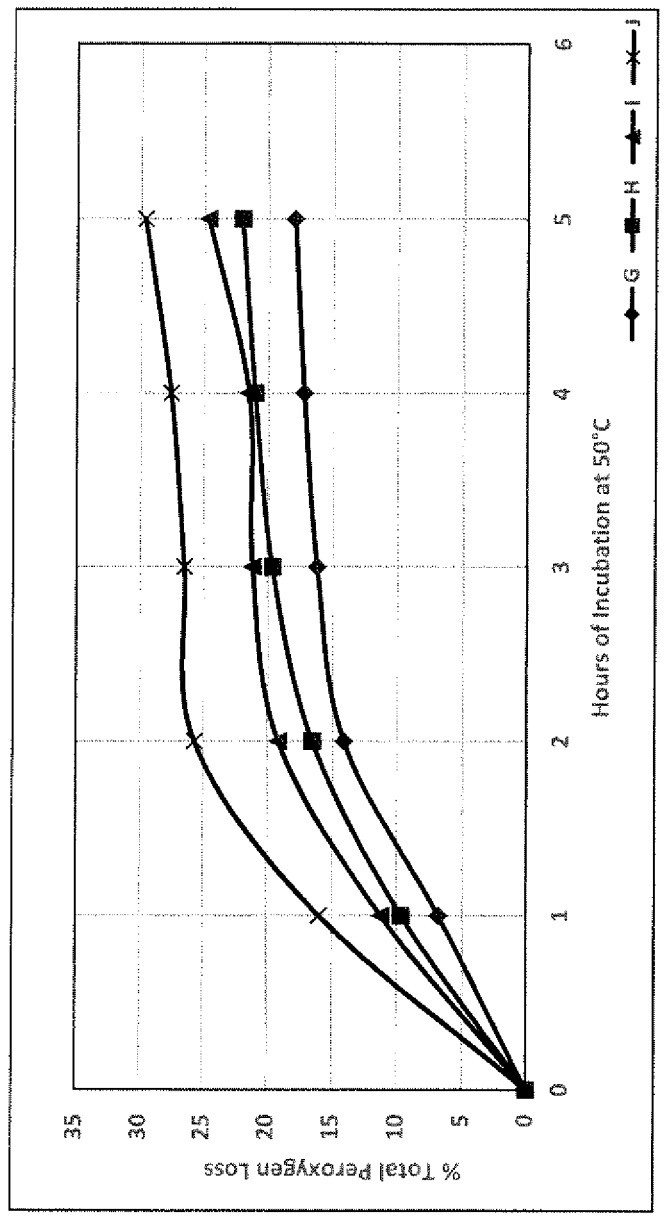

ANTIMICROBIAL COMPOSITIONS CONTAINING PEROXYPHTHALIC ACID AND/OR SALT THEREOF

This is a national stage application under 35 U.S.C. § 371 of international application PCT/IB2021/051004 filed Feb. 8, 2021, which claims priority from U.S. provisional application 62/972,344 filed Feb. 10, 2020, the entire contents of which are incorporated herein by reference.

TECHNICAL FIELD

The present invention relates to antimicrobial compositions for hard and/or soft surfaces.

BACKGROUND

Antimicrobial compositions are formulated based on the intended application. For example, compositions can be formulated as sporicides, sterilants, disinfectants, and sanitizers as these terms are known in the industry. They can also be designed to be used on a variety of surfaces such as hard and soft surfaces. Hard surfaces include surfaces present in healthcare and other institutions (e.g. sinks, countertops, tables, medical devices, instruments, food wares, food contact sites, handles, doorknobs, etc.). Soft surfaces include biological and non-biological surfaces such as skin, plants, animals, mucous membranes, wounds, fabrics, carpet, upholstery, fur, water, food, and the like. For surfaces that are vulnerable to corrosion, the antimicrobial compositions must be non-corrosive.

Sporicidal compositions (or sporicides) are intended to inactivate or kill bacterial spores, also referred to as bacterial endospores. The presence of these spores on hard and soft surfaces can present serious public health concerns. One skilled in the art would appreciate the known Spaulding hierarchy of pathogen susceptibility to antimicrobial agents. Bacterial spores such as *B. subtilis* spores are, in general, tougher to kill than mycobacteria, fungi, yeasts, enveloped and non-enveloped viruses, and vegetative bacteria. As such, an antimicrobial composition effective against bacterial spores will be expected to also inactivate mycobacteria, protozoa, fungi, yeasts, enveloped and non-enveloped viruses, and vegetative bacteria. Most sporicidal compositions, when used at higher concentrations and/or at elevated temperatures, can also be effective against prions.

Prior art antimicrobial compositions employing antimicrobial agents consisting of iodophors, phenols, quaternary ammonium compounds, and alcohols are often ineffective against bacterial spores, while other compositions employing sporicidal ingredients, such as chlorine compounds, can be irritating or toxic to the user, corrosive, and environmentally-unfriendly.

Thus, there remains a need for antimicrobial compositions that can be formulated to be effective against bacterial spores, which are safe and non-irritating to the user, environmentally-friendly, and compatible with surfaces to which they are applied.

SUMMARY OF THE INVENTION

The inventor has surprisingly found that a class of compounds, namely, peroxyphthalic acids and salts thereof, act synergistically with a number of other compounds (referred to herein collectively as "synergistic additives" and singly as "synergistic additive") such that they can be used to make effective antimicrobial compositions by combining them with these other compounds. Furthermore, these compositions can be made to be environmentally friendly, non-corrosive, safe to the user, and free of objectionable odors.

The synergistic additives can be classified as acids, solvents, surfactants, and antimicrobial metals. In some cases, the same synergistic additives can be classified in more than one of these categories (e.g., both acids and surfactants).

The present compositions can be in dry form wherein a liquid, such as water, is omitted, or in liquid form, wherein a liquid is present. Water will always be present in "end-use" or "ready-to-use" (RTU) versions of the present composition. When water is present, the peroxyphthalic acid and/or salt thereof may be present in hydrated form, and the composition will have a pH less than 6.

Thus, according to a first aspect, the present invention provides an antimicrobial composition comprising, consisting essentially of, or consisting of:
(a) an effective amount of at least one compound selected from the group consisting of peroxyphthalic acids and salts thereof;
(b) an effective amount of at least one, two, three, four, or five synergistic additives.

The synergistic additive can be an acid or salt thereof, a surfactant, a solvent and/or an antimicrobial metal.

The acid and/or salt thereof is selected from the group consisting of formic acid, acetic acid, benzoic acid, diglycolic acid, furoic acid, glycolic acid, lactic acid, mandelic acid, phenylacetic acid, sulfamic acid, sulfosuccinic acid, and salts thereof. The surfactant is selected from the group consisting of C6-C24 alkyl or aryl ether carboxylic acids and their salts, C8-C24 alkyl taurines and their salts, aryl taurines and their salts, alkoxylated C8-C24 alkyl phosphoric acid esters and their salts, and glycerol ethers. The solvent is selected from the group consisting of aromatic alcohols (e.g., benzyl alcohol, phenoxyethanol, phenethyl alcohol), C2-C8 linear or branched alcohols (e.g. ethanol, propanol, butanol, pentanol, and their isomers such as isopropanol, isobutanol, tert-butanol, isopentanol, etc.), dibasic esters (e.g., dimethyl succinate and dimethyl adipate), 2-pyrrolidone, butyl carbitol, butyl cellosolve, lactate esters (e.g., ethyl lactate, propyl lactate, butyl lactate), butyl-3-hydroxybutyrate, and triacetin. The antimicrobial metal is selected from the group consisting of copper, zinc, silver, titanium, molybdenum, tellurium, cobalt, chromium, manganese, lead, zirconium, gold, aluminum, gallium, and salts, ions, chelates, and oxides thereof (e.g. copper sulfate, zinc sulfate, silver nitrate, etc.).

The composition optionally comprises water q.s. to 100. When water is present, the composition pH will be less than about 6. Optionally, the composition can also comprise an effective amount of at least one pH adjusting agent.

In certain embodiments, the at least one acid and/or salt thereof is present and selected from the group consisting of formic acid, acetic acid, benzoic acid, diglycolic acid, furoic acid, glycolic acid, lactic acid, mandelic acid, phenylacetic acid, sulfamic acid, sulfosuccinic acid, and salts thereof. Some embodiments will contain at least one acid and/or salt thereof selected from the group consisting of formic acid, sulfamic acid, furoic acid, glycolic acid, and salts thereof, or from the group consisting of formic acid, sulfamic acid, and salts thereof. In yet other embodiments, formic acid, sulfamic acid, and/or salts thereof, will be present.

In the same or other embodiments, the composition can contain at least one synergistic additive selected from the group of surfactants consisting of C6-C24 alkyl or aryl ether carboxylic acids and their salts (e.g. capryleth-9 carboxylic acid, hexeth-4 carboxylic acid, buteth-2 carboxylic acid, hexeth-9 carboxylic acid), C8-C24 alkyl or aryl taurines and their salts (e.g. sodium methyl cocoyl taurate, sodium methyl lauroyl taurate, sodium myristoyl taurate), alkoxylated alkyl phosphoric acid esters and their salts (e.g. polyethyleneglycol octylether phosphate, polyethyleneglycol decylether phosphate, poly(oxy-1,2-ethanediyl), α-hydro-ω-hydroxy-, mono-nonylalkyl ethers, phosphate), and glycerol ethers (e.g. ethylhexylglycerin).

In the same or other embodiments, the composition can contain at least one synergistic additive selected from the group of solvents consisting of 2-pyrrolidone, benzyl alcohol, butanol, butyl carbitol, butyl cellosolve, butyl lactate, dimethyl adipate, dimethyl succinate, phenoxyethanol, ethanol, isopropanol, butyl-3-hydroxybutyrate, phenethyl alcohol, and triacetin. These compounds are solvents. Some embodiments will contain benzyl alcohol, butyl-3-hydroxybutyrate, dimethyl succinate, butyl lactate, or combinations thereof.

In the same or other embodiments, one or more copper salts and zinc salts can be present.

The present invention contemplates using any number of the above synergistic additives and in any combination. For example, embodiments of the invention can contain 1, 2, 3, 4, 5, or more of the above synergistic additives, whether from the same group or different groups, in combination with said at least one compound selected from peroxyphthalic acids and salts thereof. A preferred salt of peroxyphthalic acid is magnesium monoperoxyphthalate (MMPP).

Compositions according to the invention can further comprise, consist essentially of, or consist of an effective amount of citric acid and/or a salt thereof, (optionally) together with an aromatic alcohol. The compounds will further synergistically enhance the antimicrobial activity of the composition. Alternatively, or additionally, the composition can further comprise, consist essentially of, or consist of, an effective amount of at least one additional antimicrobial agent selected from the group consisting of essential oils, alcohols, anionic surfactants, amphoteric surfactants, quaternary ammonium compounds, phenols, aldehydes, biguanides, mineral acids, other carboxylic acids (e.g., salicylic acid), and halogen compounds.

The present compositions can be formulated as sporicides, sterilants, disinfectants (including high-level disinfectants), or sanitizers. Depending on the nature of the composition and its intended use, one or more of the following ingredients can be included: stabilizing agents, chelating agents, buffering agents, nonionic surfactants (to impart cleaning properties), cationic surfactants, hydrotropes, skin conditioning agents, anti-foaming agents, builders, soil suspenders and anti-redeposition agents, brightening agents, radical scavengers, dyes, fragrances, rheology modifiers, emulsifiers, corrosion inhibitors, softening agents, antistatic agents, anti-wrinkling agents, dye transfer inhibition agents, color protection agents, odor removal agents, odor capturing agents, preservatives, soil shielding agents, soil releasing agents, ultraviolet light protection agents, water repellency agents, insect repellency agents, anti-pilling agents, souring agents, mildew removing agents, film-forming agents, plasticizers, and allergicides.

In some embodiments, the composition comprises, consists essentially of, or consists of (a) an effective amount of citric acid, a salt thereof, or combinations thereof; (b) an effective amount of at least one synergistic additive selected from the group consisting of phenethyl alcohol, ethanol, and silver salts; (c) an effective amount of at least one additional antimicrobial agent selected from the group consisting of essential oils, alcohols, anionic surfactants, amphoteric surfactants, quaternary ammonium compounds, phenols, aldehydes, biguanides, mineral acids, other carboxylic acids (e.g., salicylic acid), and halogen compounds; and (d) an effective amount of at least one ingredient selected from the group consisting of stabilizing agents, chelating agents, buffering agents, nonionic surfactants, cationic surfactants, hydrotropes, skin conditioning agents, anti-foaming agents, builders, soil suspenders and anti-redeposition agents, brightening agents, radical scavengers, dyes, fragrances, rheology modifiers, emulsifiers, corrosion inhibitors, softening agents, antistatic agents, anti-wrinkling agents, dye transfer inhibition agents, color protection agents, odor removal agents, odor capturing agents, preservatives, soil shielding agents, soil releasing agents, ultraviolet light protection agents, water repellency agents, insect repellency agents, anti-pilling agents, souring agents, mildew removing agents, film-forming agents, plasticizers, and allergicides. In certain embodiments of these compositions, at least one essential oil (e.g. thymol) and/or at least one chelating agent (e.g. aminotris(methylenephosphonic acid, also called ATMP) will be present.

Peroxyphthalic acids and salts thereof are shelf-stable solids and dissolve readily in water, whereupon the peroxy-acid component of the peroxyphthalic acid or salt thereof will decompose over a period of a few days at ambient temperatures to form hydroxyl radicals and the dissociated form of the phthalic carboxylic group(s). Surprisingly, the rate of decomposition slows down over time when certain synergistic additives are present. This allows for more shelf-stable aqueous solutions to be prepared.

Therefore, the antimicrobial composition can be free of water until prior to use. Different formats of dry compositions according to the invention can be used. For example, the composition can be present as a free-flowing powder, granular or particulate composition, or compressed into a solid composite material. For example, the compositions can be packaged in a dissolvable film made using, e.g., polyvinyl alcohol, to form a dissolvable "puck". Examples of dry compositions according to the invention include, without limitation, those that comprise:

(a) MMPP, sodium formate, and sulfamic acid;
    (b) MMPP, citric acid, sodium formate, and salicylic acid;
    (c) MMPP, glycolic acid, and mandelic acid;
    (d) MMPP, furoic acid, and citric acid; and
    (e) MMPP, sodium formate, and citric acid.

The skilled person will appreciate which compounds are available in solid (dry) form and which can be included in dry compositions according to the invention. These include pH adjusting agents (e.g. KOH, phosphoric acid), buffering agents (e.g. citric acid), chelating agents (e.g. HEDP, EDTA), corrosion inhibitors, hydrotropes, and surfactants.

At the time of use, a user will add water or other aqueous solvents to make an aqueous composition according to the invention having a pH less than 6. If necessary, an effective amount of at least one pH adjusting agent and/or at least one buffering agent can be included in the composition to ensure that the pH is less than 6 in the aqueous end-use composition. pH adjusting agents and buffering agents that can be used include bases (e.g. KOH, NaOH), inorganic acids (e.g. phosphoric acid, sulfuric acid, HCl), and organic acids (e.g. benzene sulfonic acid). When pH adjusting agents and buffering agents are absent, a pH less than 6 can be achieved by the choice and amount of the compounds employed in the composition, for example, by using synergistic additives that are acids.

The present compositions can be formulated to have pH values ranging from about 0, 0.3, 0.5, 0.7, 1.0, 1.5, or 2.0, and up to about 5.5, 5, 4.5, 4.0, 3.5, 3.0, 2.5, 2.2, 2.0, 1.8, 1.6, 1.5, or 1.0 depending on the nature of the composition or its intended use. For example, for sporicidal hard surface applications, the end use pH can be from about 1, 1.5, or 2 and up to about 3.5, 4, or 4.5. For hard surface disinfectant applications, the end use pH can be from about 2, 2.5, or 3 and up to about 4, 4.5, or 5. For hand sanitizers, the end use pH can be from about 2.5, 3, or 3.5, and up to about 4.5, 5, or 5.5.

In some embodiments, the composition is free of at least one or all of the following compounds: other peroxyacids and salts thereof (e.g., peracetic acid), other peroxygen compounds (e.g., hydrogen peroxide, sodium perborate, sodium percarbonate), peroxygen activators (e.g., phthalic anhydride), bleaching agents, bleach activators, enzymes (e.g., proteases, lipases), polypeptides, imidazoles, alkyl dimethylamine oxides, alkyl diethylamine oxides, alkyl ethylamine oxides, dimethyl succinate, dimethyl adipate, boric acid, triacetin, and diethyl succinate, vitamins (such as those described in U.S. Pat. No. 8,999,399 to Lisowski), amino functional polymers (such as those described in US20040147426A1 to Bettiol et al.), and inorganic halides (such as those described in U.S. Pat. No. 4,822,512 to Auchincloss and US 2006/0057176 to Squire et al.).

The present invention also provides, according to a second aspect, an antimicrobial composition (according to the first aspect) packaged in a kit of parts, wherein the kit comprises a first part containing instructions for making and using the antimicrobial composition, and at least one additional part containing components of the composition which are present together or in separate parts of the kit. To avoid unwanted degradation reactions, only ingredients or compounds that can be put together in a stable manner will be combined in the same part of the kit. The skilled person will understand which ingredients or compounds can be combined in the same part and which ingredients or compounds must be housed separately in different parts.

In accordance with a third aspect, the invention provides a method of reducing a microbial load on a surface, comprising (a) identifying a surface containing microbes and in need of microbial reduction; and (b) applying an effective amount of an aqueous composition according to the first aspect of the invention to the surface for a time and at a temperature effective to reduce the number of microbes by at least 1, 2, 3, 4, or 5 $\log_{10}$.

The present methods can accord with standardized test methods for microbial reduction known in the art (e.g. those established by the American Society for Testing and Materials (ASTM), Organisation for Economic Co-operation and Development (OECD), Association of Official Agricultural Chemists (AOAC), and European Standards (EN)).

Depending on the nature of the composition and its intended use, the contact time can be from about 10 seconds, 20 seconds, 30 seconds, 40 seconds, 50, seconds, 1 minute, 2 minutes, 3 minutes, 4 minutes, or 5 minutes and up to about 60, 45, 30, 15, 10, 9, 8, 7, or 6 minutes.

Compositions according to the present invention can be used at temperatures ranging from about 0, 1, 5, 10, 15, or 20° C. and up to about 90, 80, 70, 60, 50, or 40° C. Typically, the rate of kill increases as the temperature increases. Therefore, lower contact times can be used at higher temperatures.

In some embodiments, the present composition is applied to an article using an electric device reprocessing machine (e.g. an automated endoscope reprocessor (AER)) at a temperature ranging from about 15° C. to about 80° C. An AER is a device that is widely used in healthcare and veterinary settings to reprocess endoscopes, such as duodenoscopes, and endoscope accessories, to decontaminate them between uses. AERs are designed to kill microorganisms in or on reusable endoscopes by exposing their outside surfaces and interior channels to antimicrobial solutions.

The present compositions can also be applied to microbes using any method, device, apparatus, or article known in the art. For example, the present compositions can be applied using an automated dispensing apparatus, sprayer, foamer, fogger, or soaking basin. The compositions can be embedded in a wipe, fabric, mesh, suture line, bandage, wound dressing, or other textile material to which water or an aqueous diluent can be added actively or passively. Passive application would include moisture from skin combining with a dry composition embedded in a bandage applied to a wound. The composition can also be formulated as a clear solution, emulsion, gel, or ointment wherein water is not present or is present in small quantities, ensuring minimal degradation of the peroxyphthalic(s) acid and/or salt(s) thereof. Microencapsulation formulation techniques can also be used to provide delayed, targeted, or extended release of compounds or ingredients. Furthermore, the present methods can be used in combination with other processes or methods, such as ultrasonic pulsing, vacuum depressurization, pressurization, electrostatic charging, ultraviolet emission, electrolysis, and cold corona plasma methods.

The present invention provides antimicrobial compositions that are effective against bacterial spores, and which are safe and non-irritating to the user, environmentally friendly, and compatible with surfaces to which they are applied. Notably, sporicidal compositions can be formulated with no objectionable odor.

DRAWING

The invention may be better understood with reference to the following description and drawing wherein:

FIG. 1 is a graph showing the peroxygen loss of four compositions according to the invention as a function of time.

DETAILED DESCRIPTION

When used herein, for the sake of clarity, the following terms are defined as follows.

The term "comprising" means "including without limitation." Thus, a composition comprising a list of ingredients may include additional ingredients not expressly recited. The term "consisting of" means "including the listed ingredients and such additional ingredients as can be present in the listed ingredients as natural or commercial impurities or additives." Natural and commercial impurities and additives will be apparent to the person of ordinary skill in the art with reference to the literature provided by manufacturers of the ingredients used in the present compositions. This literature includes product specification sheets and certificates of analysis (CofA). The term "consisting essentially of" means "consisting of" the listed ingredients (as defined herein) and additional ingredients that would not materially affect the basic and novel properties of the composition." By "basic and novel properties" is meant the ability of the antimicrobial composition to reduce the microbial load on a surface to be sanitized, disinfected or sterilized. A statistically valid positive or negative change in efficacy of greater than 0.6 $\log_{10}$ using ASTM E2197 Standard Quantitative Disk Carrier Test Method against *B. subtilis* spores at a contact time of up to about 5 minutes, at 20-25° C., is deemed herein to constitute a material effect.

As used herein, "wt. %", "% w/w," "weight percent," and variations thereof refer to the amount of an ingredient or compound as the weight of that ingredient or compound divided by the total weight of a composition that contains that ingredient or compound, and multiplied by 100. It is understood that the total weight percent of all ingredients and/or compounds in a composition will not exceed 100 wt. %.

As used herein, the term "about" refers to a variation in a specified numerical value that can occur, for example, through typical measuring and liquid handling procedures used for making compositions under real world conditions; through non-material inadvertent errors in these procedures; through differences in the manufacture, source, or purity of the ingredients used to make the compositions or to carry out methods using the compositions, etc. The term "about" also encompasses amounts that differ due to different equilibrium conditions for a composition resulting from a particular initial mixture. For the sake of clarity, the term "about" includes variations in the expressed value of ±5%. Whether a value is modified by the term "about," the claims include equivalents to the values.

It should be noted that, as used in this specification and the appended claims, the singular forms "a", "an", and "the" include plural referents unless the content or context clearly dictates otherwise. Thus, for example, reference to "the peroxyphthalic acid" includes reference to "peroxyphthalic acids", and so forth, unless the content or context clearly dictates otherwise.

When used herein, the term "effective amount" (vis-à-vis an ingredient) means an amount that would bring about a desired effect, based on the purpose and function of the ingredient and composition in which the ingredient is used. What constitutes an effective amount will be determinable by the person of ordinary skill in the art without having to engage in inventive experimentation. For example, an effective amount of a pH adjusting agent is that amount which would cause the pH of the solution to reach a desired value. An "effective amount" of an antimicrobial agent means an amount that, together with other ingredients in the composition will cause the composition to achieve the desired level of antimicrobial efficacy based on the intended application.

"Room temperature" means a temperature from 18° C. to 25° C., inclusive.

The ranges of values recited herein are intended to include all values within the ranges. Thus, for example, a range of 0.01 to 4.5 wt. % is intended to include values such as from 0.02, 0.03, or 0.04, etc. wt. % and up to 4.4, 4.3, or 4.2, etc. wt. %.

As used herein, the term "q.s." means "quantum sufficit" or "quantum satis" a Latin term meaning the amount which is enough, or standard pharmaceutical meaning of "as much as is sufficient".

As used herein, the term "synergistic" or "synergy" refers to a result that is more than merely additive. For example, if 'Solution 1' containing 1 wt. % of antimicrobial Agent-A demonstrates a bacterial $\log_{10}$ reduction of 0.5, and 'Solution 2' containing 1 wt. % of antimicrobial Agent-B demonstrates a bacterial $\log_{10}$ reduction of 0.5, then 'Solution 3' containing 1 wt. % of each of Agent-A and Agent-B would only be synergistic if it demonstrates a bacterial $\log_{10}$ reduction of greater than 1.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonate, phosphine, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups can be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

The present specification contemplates the possibility of omitting any components listed herein. The present specification further contemplates the omission of any components even though they are not expressly named as included or excluded from the invention.

As used herein, the phrases "objectionable odor", "offensive odor", or "malodor", refer to a sharp, pungent, or acrid odor or atmospheric environment from which a typical person withdraws if they are able to. Hedonic tone provides a measure of the degree to which an odor is pleasant or unpleasant. An "objectionable odor", "offensive odor", or "malodor" has a hedonic tone rating it as or more unpleasant than a solution of 5 wt. % acetic acid, propionic acid, butyric acid, or mixtures thereof.

The term "microbial load" means the number of microorganisms present on a surface to be disinfected.

As used herein, the term "microorganism" refers to any non-cellular or unicellular (including colonial) organism. Microorganisms include all prokaryotes. Microorganisms include bacterial spores (e.g. *B. subtilis*), mycobacteria, protozoa, non-enveloped viruses, fungal spores, vegetative fungi, yeast, vegetative bacteria (including cyanobacteria), enveloped viruses, and other virus (e.g. virinos, viroids, phages), and algae (including lichens). The term is used interchangeably herein with "microbe."

For the sake of convenience, and unless the context clearly dictates otherwise, the expression "MMPP and variants thereof" (and the like expression) are used herein interchangeably with the expression "peroxyphthalic acids and salts thereof" (and the like expression).

As used herein, the term "sanitizer" refers to an agent or composition that reduces the number of vegetative bacteria by at least a 99.9% (i.e. at least a 3 $\log_{10}$ order reduction) using standardized test methods, such as the method set out in Germicidal and Detergent Sanitizing Action of Disinfectants, Official Methods of Analysis of the Association of Official Analytical Chemists, paragraph 960.09 and applicable sections, 15th Edition, 1990 (EPA Guideline 91-2).

As used herein, the term "disinfectant" refers to an agent that kills most microorganisms, including most recognized pathogenic microorganisms, providing at least a 99.999% reduction of bacteria, and at least a 99.9% reduction of viruses. The testing could be conducted using the procedure described in A.O.A.C. Use Dilution Methods, Official Methods of Analysis of the Association of Official Analytical Chemists, paragraph 955.14 and applicable sections, 15th Edition, 1990 (EPA Guideline 91-2), germicidal spray test method for sanitizers and disinfectants, A.O.A.C suture loop sporicidal test method, or any other methods mandated by various regulatory agencies that have not been specifically outlined herein. As used herein, the term "high level disinfection" or "high level disinfectant" refers to a compound or composition that kills substantially all organisms, except high levels of bacterial spores, and is effected with a chemical germicide cleared for marketing as a high level disinfectant or sterilant by the Food and Drug Administration in United States.

Sterilants, also referred to as chemical sterilants and chemosterilants, are chemical agents that can be used in the sterilization of articles. Sterilization involves very high levels of microbial inactivation including hardy microbes such as bacterial spores, and in certain cases complete inactivation of pathogens. According to the US Food and Drug Administration (FDA), a sterilant should be able to pass the AOAC 966.04 test method against bacterial spores.

As used in this invention, the term "sporicide" refers to a physical or chemical agent or process having the ability to cause equal to or greater than a 50% inactivation in a population of spores for example of *Bacillus cereus* or *Bacillus subtilis* (*B. subtilis*), *Clostridioides difficile* (*C. difficile*, formerly called *Clostridium difficile*), *Bacillus athrophaeus, Chaetomium globosum* and *Paenibacillus chibensis*. In certain embodiments, the sporicidal compositions of the invention provide greater than a 90% reduction (1 $\log_{10}$ order reduction), greater than a 99% reduction (2 $\log_{10}$ order reduction), greater than a 99.9% reduction (3 $\log_{10}$ order reduction), greater than a 99.99% reduction (4 logic, order reduction), or greater than a 99.999% reduction (>5 $\log_{10}$ order reduction) in such populations.

Peroxyphthalic Acids and Salts Thereof

The present invention relies upon a surprising synergy between an effective amount of at least one compound selected from the group consisting of peroxyphthalic acids and salts thereof, and an effective amount of at least one synergistic additive mentioned above. This synergy allows for the preparation of effective antimicrobial compositions using the synergistic combinations herein described. This synergy cannot be expected from other peroxygen compound combinations, as will be explained further below. The compositions of this invention are also anticipated to be free of other peroxyacid compounds such as peracetic acid or peroctanoic acid. Furthermore, while the skilled person would understand that other peroxygen compounds, e.g. hydrogen peroxide and peracetic acid, are used in antimicrobial compositions, these other peroxygen compounds are not interchangeable with MMPP and variants thereof due to their different properties and functions. Indeed, MMPP and variants thereof are rarely used in commercial antimicrobial compositions since they are generally considered to have weak antimicrobial properties and degrade rapidly in the presence of water.

The peroxyphthalic acids and salts thereof include mono- and di-valent metal salts such as sodium, calcium and magnesium salts. When these acids or salts thereof are present in water, they may become hydrated. Therefore hydrated forms of these compounds are also contemplated to be within the scope of the invention.

Exemplary peroxyphthalic acids and salts thereof include magnesium monoperoxyphthalate (MMPP), magnesium peroxyphthalate, magnesium mono- or di-peroxyphthalate hydrates, calcium mono- or di-perphthalate, sodium monoperphthalates, sodium mono- or di-peroxyphthalates, mono- or di-ammonium monoperphthalate hydrates, mono- or di-ammonium peroxyphthalates, potassium mono- or di-perphthalates, magnesium mono- or di-perphthalates, calcium mono- or di-perphthalates, potassium mono- or di-perphthalates, sodium mono- or di-perphthalates, sodium potassium perphthalates, potassium hydrogen perphthalates, sodium hydrogen perphthalate, potassium acid perphthalates, mono- or di-perphthalic acid, perphthalate hydrates, 1,2 benzenedicarboperoxoic acid salts, 1,2 benzenedicarboperoxoic acid di-salts, 2-carboxy benzenecarboperoxoic acid salts, 2-carboxy benzenemonocarboperoxoic acid alkaline earth metal salts, 2-carboxy benzenemonocarboperoxoic acid alkali metal salts, 2-carboxy benzenemonocarboperoxoic acid hydrate salts, 2-carboxy benzenemonocarboperoxoic acid alkaline earth metal hydrate salts, 5-carboxy benzenemonocarboperoxoic acid salts, 5-carboxy benzenemonocarboperoxoic acid hydrate salts, 5-carboxy benzenemonocarboperoxoic acid salts, 5-carboxy benzenemonocarboperoxoic acid hydrate salts, 1,2-benzene dicarboperoxoic acid alkaline earth metal salts, 1,2-benzene dicarboperoxoic acid alkaline earth metal hydrate salts, 1,2-benzene dicarboperoxoic acid mono-salts, 1,2-benzene dicarboperoxoic acid di-salts, 1,2-benzene dicarboperoxoic acid, 1,5-benzene dicarboperoxoic acid, 1,5-benzene dicarboperoxoic acid mono-salts, 1,5-benzene dicarboperoxoic acid di-salts, and 1,5-benzene dicarboperoxoic acid alkaline earth metal salts.

Particularly preferred compounds are the magnesium salts of peroxyphthalic acids, such as MMPP, and its hydrates. These compounds have been used in a variety of applications including cleaning, laundering, bleaching, and disinfecting applications. Their antimicrobial activity was, until now, believed to be weak as compared to other peroxyacids such as peracetic acid (FAA), performic acid, and peroctanoic acid, all of which are pungently malodorous and corrosive. On the other hand, peroxyphthalic acids and salts thereof, such as MMPP, are free of objectionable or pungent odors, have low to no general corrosiveness, and are generally safe to the environment and end users. Because of the surprising synergy with the synergistic additives specified herein, highly effective antimicrobial compositions using peroxyphthalic acids and salts thereof, such as MMPP, and variants thereof herein described can be made.

While the peroxyphthalic acids and salts thereof have been used as a bleaching agent in laundry and dental applications, these compounds do not function as effective bleaching agents in the context of the present invention. This is because the present antimicrobial compositions are formulated to operate at acidic pH values of less than 6. In this range of pH, the 0-0 peroxygen single bond is stabilized and the bleaching action (caused by the breaking of this bond and generation of —OH hydroxyl radicals) is prevented. In addition, one skilled in the art would appreciate that a neutral to alkaline environment is required for MMPP and variants thereof to function as bleaching agents and/or to remove stains and dyes. For example, Thompson et al., Mechanisms of Peroxide Bleaching at High pH (J. Chem. Soc., Chem. Commun., 1992, pp. 1600-1601; DOI: 10.1039/C39920001600) and Torres et al., Influence of pH on the Effectiveness of Hydrogen Peroxide Whitening (Operative Dentistry, 2014, 39-6, E261-E268; DOI: 10.2341/13-214-L) both show a positive correlation between bleaching efficacy and increasing pH values.

The amount of the peroxyphthalic acid(s) and/or salt(s) thereof present in the composition will vary widely depending on whether the composition is in dry form or in aqueous (liquid) form. When in dry form, the total amount of the peroxyphthalic acid and/or salt thereof can be present from about 1, 1.5, 2.5, 3, 4, 5, 6, 7, 8, or 9 wt. % and up to about 90, 80, 70, 60, 50, 45, 40, 35, 30, 25, 20, 18, 16, 14, 12, 10, 8, 6, or 5 wt. %. When in aqueous form, the total amount of the peroxyphthalic acid and/or salt thereof can be present from about 0.1, 0.2, 0.5, 0.75, 1, 1.5, 2, 2.5, 3, 3.5, 4, 4.5, 5, 5.5, 6, 6.5 or 7 wt. % and up to about 25, 22, 20, 18, 17, 16, 15, 14, 13, 12, 11, 10, 9.5, 9, 8.5, 8, or 7.5 wt. %. The present compositions can also be in the form of a non-aqueous liquid where liquid ingredients (other than water) are present. Examples of liquid ingredients include formic acid, benzyl alcohol, ethylhexylglycerin, etc. In these embodiments, the amount of the peroxyphthalic acid(s) and/or salt(s) thereof will depend on their solubility in these non-aqueous liquid ingredients and will be selected so that when the user adds water, the concentration will be within the above ranges specified for the aqueous compositions.

Water-free forms of the composition can be prepared and diluted with water or an aqueous diluent at a ratio (composition:diluent) of 1:1, 1:2, 1:4, 1:8, 1:16, 1:32, 1:64, 1:128, 1:256, 1:512, or 1:1024. Ratios between these values are also contemplated.

Synergistic Additives

Compositions according to the present invention also require an effective amount of at least one synergistic additive selected from one or more of the groups of (i) acids and salts thereof; (ii) surfactants; (iii) solvents; and (iv) antimicrobial metals.

Certain members of the above classes have been found to synergistically boost the antimicrobial activity of solutions containing peroxyphthalic acid(s) and/or salt(s) thereof. This synergy is expected at all concentrations herein described.

Acids and Salts Thereof

The acids and salts thereof that act synergistically with peroxyphthalic acids and salts thereof are selected from the group consisting of (i) formic acid, acetic acid, benzoic acid, diglycolic acid, furoic acid, glycolic acid, lactic acid, mandelic acid, phenylacetic acid, sulfamic acid, sulfosuccinic acid, and salts thereof.

These compounds are present in an "effective amount." What constitutes an "effective amount" depends, at least in part, on the solubility of the acid or its salt in water. Exemplary effective amounts of certain acids and their salts useful herein are shown below.

| ACID AND SALTS THEREOF | EFFECTIVE AMOUNT IN RTU SOLUTION CONTAINING WATER (WT. %) |
|---|---|
| formic acid and salts thereof | From about 0.2, 0.4, 0.6, 0.8, 1.0, 1.2, 1.4, 1.6, 1.8 or 2.0 and up to about 20, 18, 16, 14, 12, 10, 8, or 6 |
| acetic acid and salts thereof | From about 0.2, 0.4, 0.6, 0.8, 1.0, 1.2, 1.4, 1.6, 1.8 or 2.0 and up to about 20, 18, 16, 14, 12, 10, 8, or 6 |
| benzoic acid and salts thereof | From about 0.05, 0.1, 0.15, 0.20, 0.25, 0.30, 0.35, 0.40, 0.45, or 0.5 and up to about 2, 1.5, 1, or 0.5 |
| diglycolic acid and salts thereof | From about 0.2, 0.4, 0.6, 0.8, 1.0, 1.2, 1.4, 1.6, 1.8 or 2.0 and up to about 10, 8, 6, or 4 |
| furoic acid and salts thereof | From about 0.1, 0.3, 0.4, 0.6, 0.8, 1.0, 1.2, 1.4, 1.6, 1.8 or 2.0 and up to about 10, 8, 6, or 4 |
| glycolic acid and salts thereof | From about 0.2, 0.4, 0.6, 0.8, 1.0, 1.2, 1.4, 1.6, 1.8 or 2.0 and up to about 20, 18, 16, 14, 12, 10, 8, or 6 |
| lactic acid and salts thereof | From about 0.2, 0.4, 0.6, 0.8, 1.0, 1.2, 1.4, 1.6, 1.8 or 2.0 and up to about 20, 18, 16, 14, 12, 10, 8, or 6 |
| mandelic acid and salts thereof | From about 0.1, 0.3, 0.4, 0.6, 0.8, 1.0, 1.2, 1.4, 1.6, 1.8 or 2.0 and up to about 10, 8, 6, or 4 |
| phenylacetic acid and salts thereof | From about 0.1, 0.3, 0.4, 0.6, 0.8, 1.0, 1.2, 1.4, 1.6, 1.8 or 2.0 and up to about 7, 6, 5, or 4 |
| sulfamic acid and salts thereof | From about 0.05, 0.2, 0.4, 0.6, 0.8, 1.0, 1.2, 1.4, 1.6, 1.8 or 2.0 and up to about 15, 14, 13, 12, 11, 10, 8, or 6 |
| sulfosuccinic acid and salts thereof | From about 0.2, 0.4, 0.6, 0.8, 1.0, 1.2, 1.4, 1.6, 1.8 or 2.0 and up to about 20, 18, 16, 14, 12, 10, 8, or 6 |

Any one or more of the above acid(s) and/or their salt(s) can be used. The total amount of these compounds will range from about 0.05, 0.1, 0.2, 0.3, 0.4, 0.5, 0.6, 0.8, 1.0, 1.5, 2, 2.5, 3, 3.5, 4, or 4.5 wt. % and up to about 20, 18, 16, 14, 12, 11, 10, 9, 8, 7.5, 7, 6.5, 6, 5.5, or 5 wt. %.

Surfactants

Surfactants that act synergistically with peroxyphthalic acids and salts thereof are selected from the group consisting of C8-C22 alkyl sulfonic acids and their salts, C8-C22 alkyl aryl sulfonic acids and their salts, C6-C24 alkyl or aryl ether carboxylic acids and their salts, C8-C24 alkyl or aryl taurines and their salts, alkoxylated alkyl phosphoric acid esters and their salts, and glycerol ethers.

Exemplary surfactants and their individual concentrations are shown below.

| Alkyl or aryl ether carboxylic acids and salts thereof | From about 0.05, 0.2, 0.4, 0.6, 0.8, 1.0, 1.2, 1.4, 1.6, 1.8 or 2.0 and up to about 15, 14, 13, 12, 11, 10, 8, or 6 |
|---|---|
| Alkyl or aryl taurines and salts thereof | From about 0.05, 0.2, 0.4, 0.6, 0.8, 1.0, 1.2, 1.4, 1.6, 1.8 or 2.0 and up to about 15, 14, 13, 12, 11, 10, 8, or 6 |

| alkoxylated alkyl phosphate esters and salts thereof | From about 0.05, 0.2, 0.4, 0.6, 0.8, 1.0, 1.2, 1.4, 1.6, 1.8 or 2.0 and up to about 15, 14, 13, 12, 11, 10, 8, or 6 |
|---|---|

Any one or more of the above surfactants can be used. The total amount of these compounds will range from about 0.05, 0.1, 0.2, 0.3, 0.4, 0.5, 0.6, 0.8, 1.0, 1.5, 2, 2.5, 3, 3.5, 4, or 4.5 wt. % and up to about 20, 18, 16, 14, 12, 11, 10, 9, 8, 7.5, 7, 6.5, 6, 5.5, or 5 wt. %.

Exemplary alkyl or aryl ether carboxylic acids are those compounds according to Formula 1, described at column 3, line 56 to column 4, line 4 of U.S. Pat. No. 8,865,226 to Bobbert (assigned to Aseptix Research B.V.).

Formula 1 is the following compound:

R—O—(CH(Y)·CH—O)$_n$CH—COOH    [Formula 1]

wherein R is an alkyl or alkenylene radical containing 6-12 carbon atoms, Y is H or CH and n is 3-10. Preferably, R is a straight chain alkyl radical. Also preferably, R is an alkyl radical of 6-10 carbon atoms, more preferably of 6-8 carbon atoms. An individual compound with a structure according to Formula 1 may further contain only propoxy or only ethoxy groups or may contain a mixture of ethoxy and propoxy groups. Preferably, n is 3-8 and/or Y is H. Examples are those acid surfactants marketed under the trade name AKYPO LF1, LF2, LF4 LF6 and LF7 (from KAO Chemicals).

Alkyl or aryl taurines are a class of anionic surfactants that can exist in acidic form or as neutralized salts. These classes of anionics are formed through attaching two alkyl chains of the same or different length to the nitrogen end of a taurine molecule. In some cases, at least one of the alkyl chains may have one or more ethoxylation units, or contain a ring structure. In some other cases, the reacted alkyl chain with taurine may be a carboxylic acid or an alcohol. Exemplary compounds include sodium methyl lauroyl taurate (trade name AMINOSYL™ SLMT), sodium methyl myristoyl taurate, and sodium methyl palmitoyl taurate. The most preferred class of alkyl or aryl taurines contains compounds having a short methyl or ethyl residue plus a longer lauroyl or myristoyl chain attached to the N-terminal of the taurine.

Alkoxylated alkyl phosphate esters are anionic surfactants that are formed from an esterification reaction of fatty acids and phosphoric acids and can exist in acid or salt forms. The alkyl chain can range in length from six to twenty-four carbon atoms, can contain ethoxy or propoxy units, or contain a ring structure. Exemplary compounds include MULTITROPE™ 1214 which is a mixture of alkoxylated C8-C10 alkyl phosphate esters.

Solvents

Solvents that act synergistically with peroxyphthalic acids and salts thereof are aromatic alcohols (e.g., benzyl alcohol, phenoxyethanol, phenethyl alcohol), C2-C8 linear or branched alcohols (e.g. ethanol, propanol, butanol, pentanol, and their isomers such as isopropanol, isobutanol, tert-butanol, isopentanol, etc.), dibasic esters (e.g., dimethyl succinate and dimethyl adipate), 2-pyrrolidone, butyl carbitol, butyl cellosolve, lactate esters (e.g., ethyl lactate, propyl lactate, butyl lactate), butyl-3-hydroxybutyrate, and triacetin.

Some of the above solvents have antimicrobial properties. However, none of these antimicrobial solvents alone are known to be effective in inactivating bacterial spores.

When these synergistic solvents are used, they can be present in concentrations from about 0.05, 0.1, 0.2, 0.3, 0.4, 0.5, 0.6, 0.8, 1.0, 1.5, 2, 2.5, 3, 3.5, 4, or 4.5 wt. % and up to about 90, 80, 70, 60, 50, 40, 30, 20, 18, 16, 14, 12, 11, 10, 9, 8, 7.5, 7, 6.5, 6, 5.5, or 5 wt. %.

Antimicrobial Metals

The present specification shows copper sulfate and zinc sulfate as being synergistic with MMPP. Based on these findings, it is predicted that other antimicrobial metals are expected to be synergistic with peroxyphthalic acids and salts thereof. The present invention contemplates synergies between peroxyphthalic acids and their salts with one or more antimicrobial metals selected from the group consisting of copper, zinc, silver, titanium, molybdenum, tellurium, cobalt, chromium, manganese, lead, zirconium, gold, aluminum, gallium, and salts, ions, chelates, and oxides thereof. The antimicrobial metals can be present as nanoparticles, or fine mesh powders.

When these synergistic metal compounds are used, they can be present in concentrations from about 0.005, 0.01, 0.05, 0.1, 0.2, 0.3, 0.4, 0.5, 0.6, 0.8, 1.0, 1.5, 2, 2.5, 3, 3.5, 4, or 4.5 wt. % and up to about 15, 12, 11, 10, 9, 8, 7.5, 7, 6.5, 6, 5.5, or 5 wt. %.

Optional Ingredients

The composition can further comprise an effective amount of one or more additional ingredients depending on the intended application. Such additional ingredients include abrasive agents, additional acids, additional antimicrobial agents, additional solvents, additional surfactants (e.g. anionic surfactants, nonionic surfactants, amphoteric surfactants, cationic surfactants), allergicides, anti-foaming agents, antioxidants, anti-pilling agents, anti-redeposition agents, anti-static agents, anti-wrinkling agents, buffering agents, builders, brightening agents, chelating agents, color protection agents, corrosion inhibitors, dyes, dye transfer inhibition agents, emulsifiers, enzymes (e.g. proteases, lipases), film forming agents, flame retardants, foaming agents, fragrances, hydrotropes (e.g. linear alkylbenzene sulphonates (LAS), and xylene sulfonate), lubricants, metal salts, mildew removing agents, odor removal agents, odor capturing agents, peracid precursors, pH adjusting agents, plasticizers, preservatives, radical scavengers, rheology modifiers, skin conditioning agents, softening agents, soil releasing agents, soil shielding agents, soil suspenders, souring agents, stabilizing agents, ultraviolet light protection agents, vitamins, water repellency agents, and wound healing agents.

Some of the above ingredients can be used to enhance surface compatibility. For example, to enhance the compatibility of the composition with living tissues such as skin and plants, the composition can contain skin conditioning agents, emollients, buffering agents, rheology modifiers, astringents, and wound healing agents. To enhance compatibility with metal substrates, such as those made of copper, copper alloys, cast iron, and/or chromium, the composition can contain corrosion inhibitors, buffering agents, rheology modifiers, and chelating agents.

pH Adjusting and Buffering Agents

In aqueous antimicrobial compositions, at least one pH adjusting agent and/or buffering agent can be used in an amount effective to adjust and/or keep the pH of the solution to below 6. Examples include, without limitation, inorganic acids (e.g. phosphoric acid) and salts thereof, organic acids (e.g. citric acid, methane sulfonic acid, p-toluene sulfonic acid) and salts thereof, and alkaline agents (e.g. potassium hydroxide and sodium hydroxide). It will be appreciated that acids according to the invention can also function as pH adjusting agents and vice versa.

The desired pH will depend on the specific application as will be apparent to the skilled person. For example, if an additional antimicrobial agent is used, the desired pH may be the value or range of values at which the additional antimicrobial agent is most effective, or to provide specific desired properties, provided that the pH is less than 6. The pH which an additional antimicrobial agent is most effective will depend on the agent as will be apparent to the skilled person.

Useful pH ranges are described above. In certain embodiments, the pH adjusting and/or buffering agent is present in a total concentration of from about 0.01, 0.5, 1, 1.5, 2, 2.5, 3, 3.5, 5, or 7 wt. %, and up to about 20, 15, 12, 10, 8, 6, 4, 2.2, 0.1, or 0.05 wt. %.

Additional Antimicrobial Agents

As mentioned above, the present compositions can include one or more additional antimicrobial agents to further enhance the activity of the composition. These agents can be selected from the group consisting of additional anionic surfactants, amphoteric surfactants, quaternary ammonium compounds, phenols, essential oils, aldehydes, biguanides, mineral acids, other peroxygen compounds (e.g. hydrogen peroxide, peracetic acid, peroctanoic acid, benzoyl peroxide, sodium perborate, sodium percarbonate, lithium peroxide), other carboxylic acids (e.g., salicylic acid) and halogen compounds.

Exemplary additional anionic surfactants include sodium lauryl sulfonate, sodium lauryl sulfate, dodecylbenzene sulfonic acid, and the class of alkyldiphenyloxide disulfonates. Exemplary amphoteric surfactants include cocamidopropyl betaine, alkylamine oxides, and the like. Exemplary quaternary ammonium compounds include benzalkonium chloride, C12-18-alkyl [(ethylphenyl) methyl] dimethyl, chlorides, octyl decyl dimethyl ammonium chloride, didecyl dimethyl ammonium chloride, and dioctyl dimethyl ammonium chloride.

When used, the one or more additional antimicrobial agents can be present in an amount from about 0.005, 0.1, 1, 5, 10, or 20 wt. %, and up to about 60, 50, 40, 30, 25, 15, 8, 3, or 0.5 wt. %.

Chelating Agents

As mentioned above, chelating agents can optionally be included for the purpose of metal ion chelation, corrosion prevention, and in certain cases as antimicrobial agents or enhancers of antimicrobial activity. Useful chelating agents include, without limitation, 1-hydroxyethane-1,1-diphosphonic acid (HEDP, also referred to herein as etidronic acid), ethylenediaminetetraacetic acid (EDTA), glutamic acid diacetic acid (GLDA), methylglycine diacetic acid (MGDA), polymandelic acid, diethylenetriaminepentaacetic acid (DTPA), N-(hydroxyethyl)-ethylenediaminetriacetic acid (HEDTA), nitrilotriacetic acid (NTA), 2-hydroxyethyliminodiacetic acid (HEIDA), benzoic acid, aminobenzoic acid, citric acid, iminodisuccinic acid, polyaspartic acid, phosphoric acid, tripolyphosphate, amino trimethylene phosphonic acid) (ATMP), diethylenetriaminepenta(methylene phosphonic acid), 2-hydroxy ethylimino bis(methylene phosphonic acid), ethylene diamine tetra(methylene phosphonic acid), hexamethylenediamine-tetra(methylene phosphonic) acid, and salts thereof.

When used, the chelating agents can be present in a concentration of from about 0.005, 0.1, 1, 2, 3, 4, 5, 7, or 10 wt. % and up to about 20, 17.5, 15, 12.5, 8.5, or 2.5 wt. %.

Other Solvents

The present compositions can optionally contain at least one additional solvent to, for example, enhance cleaning and/or to help solubilize ingredients in the solution.

Exemplary additional solvents include carbonates (e.g. ethylene carbonate, propylene carbonate, butylene carbonate, and glycerin carbonate), benzyl acetate, benzyl benzoate, acetophenone, 2-acetyl-1-methylpyrrole, dialkyl carbonate, organo-nitriles, phthalate esters, propylene glycol derivatives with ethoxylation and/or propoxylation, alkoxytriglycols and other glycols such as methoxytriglycol, ethoxytriglycol, butoxytriglycol, hexyltriglycol, propylene glycol methyl ether acetate, dipropylene glycol methyl ether acetate, dipropylene glycol n-butyl ether, propylene glycol n-butyl ether, dipropylene glycol n-propyl ether, propylene glycol n-propyl ether, dipropylene glycol methyl ether, tripropylene glycol methyl ether, methanol, branched or unbranched dials, charged or uncharged non-surfactant emulsifying agents, polar protic solvents, other polar aprotic solvents, diethylene glycol monoethyl ether and mixtures thereof.

In certain embodiments the additional solvent(s) is present in a concentration of from about 0.1, 0.5, 1, 1.5, 2, 2.5, 3, 3.5, 4, 4.5, 5, 6, 7, 8, 9 or 10 wt. % and up to about 50, 40, 35, 30, 25, 20, 18, 16, 14, or 12 wt. %.

The additional solvent(s) will generally not be more than about 20 wt. % in ready-to-use solutions, or more than about 50 wt. % in concentrated solutions.

Nonionic Surfactants

Nonionic surfactants can be included to enhance the cleaning properties of the present solutions and/or to enhance solubility of ingredients contained therein.

Suitable nonionic surfactants include alkoxylated surfactants such as alkoxylates made from ethylene oxide (EO), propylene oxide (PO), and butylene oxide (BO). Suitable alkoxylated surfactants include homo or copolymers or terpolymers, capped EO/PO/BO copolymers, alcohol alkoxylates, capped alcohol alkoxylates, mixtures thereof, or the like.

Suitable alkoxylated surfactants for use as solvents include EO/PO block copolymers, such as the Pluronic™ and reverse Pluronic surfactants; alcohol alkoxylates such as Dehypon™ LS-54 and Dehypon™ LS-36, and capped alcohol alkoxylates such as Plurafac™ LF221 and Tegoten™ EC11. More specifically, the composition of the present specification can include an alkoxylated primary or secondary alcohol having from 8 to 18 carbon atoms reacted with from 2 to 12 moles of ethylene, and/or propylene, and/or butylene oxide. In an embodiment, the nonionic surfactant has from 3 to 18 moles of alkylene oxide, in another embodiment from 3 to about 10 moles of ethylene oxide (EO), and in yet another embodiment about 7 moles of EO. Examples include lauryl alcohol ethoxylated with 3 moles of ethylene oxide (EO), coco alcohol ethoxylated with 3 moles EO, stearyl alcohol ethoxylated with 5 moles EO, mixed C12-C15 alcohol ethoxylated with 7 moles EO, mixed secondary C11-C15 alcohol ethoxylated with 7 moles EO, mixed C9-C11 linear alcohol ethoxylated with 6 moles EO and the like. In some embodiments, the nonionic surfactant can have from 8 to 15 carbon atoms in the alkyl group. In an embodiment, the composition comprises the alcohol alkoxylates, particularly the alcohol ethoxylates and propoxylates, especially the mixed ethoxylates and propoxylates, particularly with 3-7 oxyethylene (EO) units and 3-7 oxypropylene (PO) units such as the alcohol Dehypon™ available from Cognis Corporation, having 5 EO units and 4 PO units.

When used, in certain embodiments, the concentration of the nonionic surfactant can be from about 0.02, 0.1, 1, 3, 5, 7, 10, or 20 wt. %, and up to about 30, 25, 15, 12, 8, 3, or 0.5 wt. %.

Anionic Surfactants

Anionic surfactants can provide antimicrobial and/or cleaning properties to a solution. Most anionic surfactants can be present in acid or salt form. The acid form arises when the surfactant is present in its free (dissociated) form in solution. Certain classes of anionic surfactants can act as antimicrobial agents. Anionic surfactants that can be included in the present compositions include, without limitation, alkyl aromatic sulfonic acids (e.g. alkyl benzene sulfonic acid), alkyl diphenyl oxide disulfonic acids, alkyl sulfuric acids, alkyl ether sulfuric acids, alkyl ethoxy or propoxy sulfuric acid, alkyl sulfonic acids, alkyl sarcosines, fatty oleyl glycerol sulfuric acid, alkyl phenol ethylene oxide ether sulfuric acid, glutamine sulfuric acid and salts thereof. Other anionic surfactants that can be used include sulfates of alkylpolysaccharides such as the sulfates of alkylpolyglucoside, alkyl poly(ethyleneoxy) ether sulfates and aromatic poly(ethyleneoxy) sulfates such as the sulfates or condensation products of ethylene oxide and nonyl phenol (usually having 1 to 6 oxyethylene groups per molecule), sulfate esters, sulfonate esters, and secondary carboxylates. The secondary carboxylates include those which contain a carboxyl unit connected to a secondary carbon. The secondary carbon can be in a ring structure, e.g. as in p-octyl benzoic acid, or as in alkyl-substituted cyclohexyl carboxylates. Suitable secondary soap surfactants typically contain 11-13 total carbon atoms, although more carbons atoms (e.g., up to 16) can be present. Suitable carboxylates also include acylamino acids (and salts), such as acylglutamates, acyl peptides, and the like.

Preferred additional anionic surfactants include C5-C24 alkylbenzene sulfonates; alkyl sarcosines and their salts, C5-C24 olefin sulfonates, C5-C24 paraffin sulfonates, cumene sulfonate, xylene sulfonate; C5-C24 alcohol sulfates (preferably C5-C12 alcohol sulfates), and C5-C24 alcohol ether sulfates having 1 to about 20 ethylene oxide groups. Other suitable anionic surfactants include alkyl phosphonates, alkyl ether phosphonates, alkyl phosphates, and alkyl ether phosphates.

When used, the anionic surfactant(s) can be present in an amount from about 0.02, 0.1, 0.2, 0.4, 0.8, 1, 2.5, 5, 6.5, 10, or 20 wt. %, and up to about 60, 50, 40, 30, 25, 20, 15, 8, 3, or 0.5 wt. %.

Hydrotropes

In certain embodiments, the solution or composition of the invention may include one or more hydrotropes for improving solubility and phase stability, such as salts of aryl and alkylaryl sulfonic acids such as xylene sulfonic acid, cumene sulfonic acid, and toluene sulfonic acid. Other hydrotropes include polyether phosphate esters, alkyl sulfates, alkyl and alkylaryl sulfonates, diphenyloxide disulfonates, and benzoic acid salts.

When used, in certain embodiments, the hydrotrope can be present in a concentration of from about 0.1, 0.5, 1, 1.5, 2, 2.5, 3, 3.5, 4, 4.5, 5, 6, 7, 8, 9, 10, 15, or 20 wt. % and up to about 40, 35, 30, 25, 20, or 17 wt. %.

It will be appreciated that certain hydrotropes can also be categorized as anionic or nonionic surfactants.

Skin Conditioning Agents

In embodiments for use on skin, the solution may include an effective amount of at least one emollient, humectant or other skin conditioning agent, including but not limited to glycerin, polyglycerin, butylene glycol, glycerides, castor oil, allantoin, cationic polymers, lanolin and its derivatives, polyols and glycols such as glycerol, polyglycerol, sorbitol, mannitol, erythritol, xylitol, arabitol, ribitol, dulcitol, lactitol, maltitol, propylene glycol, hexylene glycol, ceramides, essential fatty acids such as linolenic acid, gamma-linolenic acid, linoleic acid, gamma-linoleic acid, tocopherols such as tocopheryl acetate, quaternised gums, quaternised polymers, glucose-ethers, vegetable oils, long chain fatty acids, long chain alcohols (e.g. cetyl alcohol), and phospholipids, and mineral oils.

When used, in certain embodiments, the skin conditioning agent can be present in a concentration of from about 0.01, 0.5, 2, 5, or 10 wt. %, and up to about 30, 25, 20, 15, 8, 4, or 1 wt. %.

EXAMPLES

The invention is further illustrated by the following non-limiting examples which employ the ingredients in TABLE A. The amount of ingredients in each example is expressed in terms of wt. % based on the total composition. The ingredients specified are the raw materials used to make the solutions. Since the raw materials, in some cases, have a concentration of the active or compound that is less than 100 wt. %, to determine the actual amount of the active or compound in the example solutions, one must multiple the amount of the compound in the starting material, with the amount specified in the tables summarizing the example solutions and divide by 100 to arrive at the actual concentration in the example solutions (expressed in terms of wt. % based on the total solution).

TABLE A

| INGREDIENT | PURITY | MANUFACTURER | COMPOUND | CATEGORY |
| --- | --- | --- | --- | --- |
| 2, 2-Bishydroxymethyl) propionic acid | 100% | Sigma | 2, 2-bis(hydroxymethyl) propionic acid | Acid |
| 5-sulfosalicylic acid *2H$_2$O | 100% | Sigma | 5-sulfosalicylic acid di hydrate | Acid |
| Acetic acid | 100% | Sigma | Glacial acetic acid | Acid |
| Benzoic acid | 100% | Sigma | Benzoic acid | Acid |
| Boric acid | >99% | Sigma | Boric acid | Acid |
| Citric acid | 95-100% | Brenntag | Citric acid anhydrous | Acid |
| Cyanuric acid | 100% | Sigma | Cyanuric acid | Acid |
| Diglycolic acid | 90-100% | Sigma | Diglycolic acid | Acid |
| Formic acid | 85% | Alphachem | Formic acid | Acid |
| Furoic acid | 100% | Swadev | 2-furoic acid | Acid |
| Gallic acid | >98% | Derbiotec | Gallic acid | Acid |

TABLE A-continued

| INGREDIENT | PURITY | MANUFACTURER | COMPOUND | CATEGORY |
|---|---|---|---|---|
| Glycolic acid | 70% | DuPont | Glycolic acid | Acid |
| Lactic acid | 80-90% | Sigma | Lactic acid | Acid |
| Lignosulfonic acid | 100% | Sigma | Lignosulfonic acid | Acid |
| Lipoic acid | 10% | Sigma | alpha-Lipoic acid | Acid |
| Mandelic acid | 100% | Sigma | Mandelic acid | Acid |
| Phenylacetic acid | 100% | Sigma | Phenylacetic acid | Acid |
| Phenylglyoxylic Acid | 100% | Sigma | 2-pyrrolidone-5-carboxylic acid | Acid |
| Phosphoric acid | 75% | Univar | Phosphoric acid | Acid |
| Phthalic acid | 100% | Sigma | Phthalic acid | Acid |
| Picolinic acid | 100% | Sigma | 2-picolinic aid | Acid |
| pTSA | 98% | Sigma | p-Toluenesulfonic acid monohydrate | Acid |
| Pyroglutamic acid | 100% | Sigma | Pyroglutamic acid | Acid |
| Salicylic acid | >99% | Colombus | Salicylic acid | Acid |
| Sulfamic acid | 100% | LabChem | Sulfamic acid | Acid |
| Sulfosuccinic acid | 70% | Sigma | Sulfosuccinic acid | Acid |
| KOH | 45% | UBA | Potassium hydroxide | Alkaline agent |
| Dequest 2010 | 60% | Italmach | Etidronic acid | Chelating agent |
| Cobratec 35-G | 35% | CCC Chemicals | Benzotriazole | Corrosion Inhibitor |
| Sodium Molybdate | 100% | Sigma | Sodium molybdate dihydrate | Corrosion Inhibitor |
| XFO-64 | Mixture | Ivanho | Proprietary | Defoamer |
| Stepanate SXS | 40% | Stepan | Sodium xylenesulfonate | Hydrotrope |
| Hydrogen peroxide | 50% | Arkema | Hydrogen Peroxide | Peroxygen compound |
| MMPP | 100% | Sigma | Magnesium bis(monoperphthalate) hexahydrate | Peroxygen compound |
| Oxone | 90-100% | Sigma | Pentapotassium bis(peroximonosulfate) bis(sulphate) | Peroxygen compound |
| Copper sulfate | 100% | Sigma | Copper (II) sulfate heptahydrate | Salt |
| THPS | 70-75% | Sigma | Bis[tetrakis(hydroxymethyl) phosphonium] sulfate | Salt |
| Zinc sulfate heptahydrate | 100% | Sigma | Zinc sulfate heptahydrate | Salt |
| 2-pyrrolidone | >99% | BASF | 2-pyrrolidone | Solvent |
| Benzyl alcohol | 95-100% | Univar | Benzyl alcohol | Solvent |
| Biopure nC4-OL | >99.8% | Acme-Hardesty | 1-butanol | Solvent |
| Butyl carbitol | >99% | Dow | Diethylene glycol monobutyl ether | Solvent |
| Butyl cellosolve | >99% | Dow | Ethylene glycol monobutyl ether | Solvent |
| Butyl lactate | 100% | Sigma | Butyl lactate | Solvent |
| Dimethyl adipate | 100% | Sigma | Dimethyl adipate | Solvent |
| Dimethyl isosorbide | >99% | Sigma | Dimethyl isosorbide | Solvent |
| Dimethyl succinate | 100% | Sigma | Dimethyl succinate | Solvent |
| Dimethylol propionic acid | 100% | Sigma | 2,2-bis(hydroxymethyl) propionic acid | Solvent |
| D-limonene | 100% | Univar | D-limonene | Solvent |
| Dowanol EPH | >99.5% | Dow | Phenoxyethanol | Solvent |
| Dowanol TPM | 98% | Dow | Tripropyleneglycol methyl ether | Solvent |
| Ethanol | 100% | VWR | Ethyl alcohol | Solvent |
| Isopropanol | 100% | VWR | Isopropyl alcohol | Solvent |
| Omnia | >98% | Eastman | Butyl-3-hydroxybutyrate | Solvent |
| Phenethyl alcohol | 100% | Sigma | Phenethyl alcohol | Solvent |
| Propylene carbonate | 100% | Sigma | Propylene carbonate | Solvent |
| Tam isolve NxG | >99.5% | Eastman | Butyl pyrrolidinone | Solvent |
| Triacetin | | | | |
| Triethyl citrate | 100% | Sigma | Triethyl citrate | Solvent |
| Akypo LF-2 | 25-100% | Kao | Alkyl ether carboxylic acid | Surfactant |
| Alfonic 610-3.5 | 100% | Sasol | C6-C12 alcohol ethoxylates | Surfactant |
| Aminosyl SLMT | >93.35% | Jarchem | Sodium methyl lauryl taurate | Surfactant |

TABLE A-continued

| INGREDIENT | PURITY | MANUFACTURER | COMPOUND | CATEGORY |
|---|---|---|---|---|
| Bio-Soft S-101 | 95% | Stepan | Alkylbenzenesulfonic acid | Surfactant |
| Bioterge PAS-8S | 35-40% | Stepan | Sodium octanesulfonate | Surfactant |
| BTC 1210 | 80% | Stepan | Didecyl dimethyl ammonium chloride & Alkyl (C12-16) dimethyl benzyl ammonium chloride | Surfactant |
| Crodasinic LS30 | 30% | Croda | Sodium lauroyl sarcosinate | Surfactant |
| Dowfax C-6L | 45% | Dow | Disodium hexyl diphenyl ether disulphonate | Surfactant |
| Ethox 3115 | 100% | Ethox | Polyalkylene tridecyl ether | Surfactant |
| Multitrope 1214-LQ-(MV) | 90-100% | Croda | Alkoxylated phosphate ester | Surfactant |
| Sensiva SC 50 | >95% | Schulke | Ethyl hexylglycerin | Surfactant |
| Surfadone LP-100 | >99.5% | BASF | 1-octylpyrrolidine-1-one | Surfactant |
| Tomadol 91-2.5 | 100% | Air Products | C9-C11 alcohol ethoxylates | Surfactant |
| Tomadol 91-6 | 100% | Air Products | C9-C11 alcohol ethoxylates | Surfactant |
| DI Water | 100% | Not applicable | Deionized water | Diluent |

Example 1

Solutions 1-81 were prepared and summarized in Tables 1 to 5 below, wherein the amount of each ingredient is shown in terms of wt % of raw material used.

Solutions 1-65 are summarized in Table 1 (split into eight parts) and were tested against spores, *B subtilis*, using the ASTM E2197 Standard Quantitative Disk Carrier Test Method at a contact time of three minutes and at room temperature (18° C. to 25° C.). The ASTM E2197 method uses brushed stainless-steel disks as the carrier surface on which live microorganisms (in this case spores) are deposited as the test inoculum. These test carriers are then exposed to the antimicrobial test solutions for a set contact time. After neutralization of the antimicrobial agent, the surviving microbial cells are enumerated and a total microbicidal efficacy is determined by comparison of the pre and post antimicrobial treatment populations. This reduction in microbial population is expressed in a logarithmic scale of base ten.

All solutions in Tables 1 to 5 were prepared in two steps. First, base solutions without MMPP were prepared. The base solutions employ compounds that are not known to be sporicidal (see A. D. Russell, Bacterial Spores and Chemical Sporicidal Agents, CLINICAL MICROBIOLOGY REVIEWS, April 1990 p. 99-119). Second, MMPP was added to and dissolved in the base solutions prior to testing.

Table 1—Part 1 shows a base solution (Solution 1), the base solution with hydrogen peroxide (Solution 2), the base solution with MMPP (Solution 3), and the base solution with both MMPP and hydrogen peroxide (Solution 4). Comparing the result for Solution 4 with the results for Solutions 2 and 3, one can see that hydrogen peroxide and MMPP do not act synergistically in the base solution to inactivate bacterial spores.

Solution 5 contains the base solution with furoic acid (also called 2-furan carboxylic acid). Solution 6 contains the base solution with furoic acid and MMPP. Solution 21 (see below Table 1—Part 2) contains furoic acid and hydrogen peroxide in the base solution. Comparing the result for Solution 6 with the results for Solutions 5 and 3, one can see that MMPP and furoic acid act synergistically in the base solution. Solution 21 demonstrates no synergy between furoic acid and hydrogen peroxide under the conditions of the test.

Solution 7 contains mandelic acid in the base solution. Solution 8 contains both mandelic acid and MMPP in the base solution. The result for Solution 8 (compared to results for Solutions 3 and 7) shows that mandelic acid and MMPP (Solution 8) act synergistically in the base solution.

Solution 9 contains glycolic acid in the base solution. Solution 10 contains both glycolic acid and MMPP in the base solution. The result for Solution 10 (compared to the results for Solutions 3 and 9) shows that glycolic acid and MMPP act synergistically in the base solution.

TABLE 1

Part 1

| INGREDIENT | 1 | 2 | 3 | 4 | 5 | 6 | 7 | 8 | 9 | 10 |
|---|---|---|---|---|---|---|---|---|---|---|
| Bio-Soft S-101 | | | | | 0.25 | | | | | |
| Stepanate SXS | | | | | 0.5 | | | | | |
| Dequest 2010 | | | | | 0.5 | | | | | |
| Dowanol TPM | | | | | 3.5 | | | | | |
| XFO-64 | | | | | 0.12 | | | | | |
| Furoic acid | | — | | — | 2.2 | | | | | |
| Mandelic acid | | | | — | | | 2.2 | | — | |
| Glycolic acid | | | | | | — | | | 2.3 | |
| Hydrogen peroxide | — | 5 | — | 5 | | — | | | | |
| MMPP | — | | 2 | | — | 2 | — | 2 | — | 2 |
| KOH/pTSA | | | | | pH to 2.4 | | | | | |
| DI Water | | | | | q.s. to 100 | | | | | |
| Spore $\log_{10}$ reduction in 3 minutes | 0.13 | 0.37 | 0.46 | 0.58 | 0.18 | 2.53 | 0.13 | 1.06 | 0.10 | 1.14 |

TABLE 1

Part 2

| INGREDIENT | 11 | 12 | 13 | 14 | 15 | 16 | 17 | 18 | 19 | 20 | 21 |
|---|---|---|---|---|---|---|---|---|---|---|---|
| Bio-Soft S-101 | | | | | | 0.25 | | | | | |
| Stepanate SXS | | | | | | 0.5 | | | | | |
| Dequest 2010 | | | | | | 0.5 | | | | | |
| Dowanol TPM | | | | | | 3.5 | | | | | |
| XFO-64 | | | | | | 0.12 | | | | | |
| Furoic acid | | | | | | — | | | | | 2.2 |
| Salicylic acid | | 0.25 | | | | | | — | | | |
| Pyroglutamic acid | | — | | 1.5 | | | | — | | | |
| Diglycolic acid | | — | | | 2 | | | — | | | |
| Phenylacetic acid | | | — | | | 1.5 | | — | | | |
| Phthalic acid | | | — | | | | 0.6 | — | | | |
| Triethyl citrate | | | — | | | | | 4 | — | | |
| Dimethyl isosorbide | | | — | | | | | | 4 | | |
| Dimethylolpropionic acid | | | — | | | | | | | 4 | — |
| Hydrogen peroxide | | — | 5 | | | | — | | | | 5 |
| MMPP | — | | | | | 2 | | | | | — |
| KOH/pTSA | | | | | | pH to 2.4 | | | | | |
| DI Water | | | | | | q.s. to 100 | | | | | |
| Spore Log$_{10}$ Reduction in 3 minutes | 0.19 | 0.66 | 0.87 | 0.90 | 1.22 | 1.76 | 0.83 | 0.45 | 0.32 | 0.70 | 0.19 |

Solution 11 contains salicylic acid in the base solution. Solution 12 contains salicylic acid and MMPP in the base solution. The result for Solution 12, compared with the results for Solutions 3 and 11 show that salicylic acid does not act synergistically with MMPP in the base solution. Solution 13 contains salicylic acid, MMPP and hydrogen peroxide in the base solution. The result for Solution 13 (compared to Solutions 2 and 12) shows no synergy when hydrogen peroxide is added.

Solutions 14 to 20 show the effect of adding individual acids, one salt (triethyl citrate), and one solvent (dimethyl isosorbide) to MMPP in the base solution. Comparing the results with results (not shown), synergies with MMPP were established for Solution 14 (pyroglutamic acid), Solution 15 (diglycolic acid), Solution 16 (phenylacetic acid), Solution 17 (phthalic acid), and Solution 20 (dimethylolpropionic acid). No synergy with MMPP was established for Solution 18 and 19 (triethyl citrate and dimethyl isosorbide, respectively).

TABLE 1

Part 3

| INGREDIENT | 22 | 23 | 24 | 25 | 26 | 27 | 28 | 29 | 30 | 31 |
|---|---|---|---|---|---|---|---|---|---|---|
| Bio-Soft S-101 | | | | | 0.25 | | | | | |
| Stepanate SXS | | | | | 0.5 | | | | | |
| Dequest 2010 | | | | | 0.5 | | | | | |
| Dowanol TPM | | | | | 3.5 | | | | | |
| Benzoic acid | 0.25 | | | | | — | | | | |
| Benzyl alcohol | — | 3.5 | | | | — | | | | |
| Oxone | — | | 0.5 | | | — | | | | |
| Ethanol | | — | | 20 | | | | | | |
| Isopropanol | | — | | | 20 | | | | | |
| Sulfamic acid | | — | | | | 0.5 | | — | | |
| Sulfosuccinic acid | | — | | | | | 1 | — | | |
| Picolinic acid | | | — | | | | | 1 | — | |
| Cyanuric acid | | | — | | | | | | 0.2 | — |
| Acetic acid | | | | | — | | | | | 1 |
| MMPP | | | | | 2 | | | | | |
| KOH/Ptsa | | | | | pH to 2.4 | | | | | |
| DI Water | | | | | q.s. to 100 | | | | | |
| Spore Log$_{10}$ Reduction in 3 minutes | 1.50 | 4.60 | 1.20 | 1.16 | 1.62 | 2.56 | 1.30 | 0.54 | 0.72 | 1.57 |

Solutions 22 to 31 show the effect of combining MMPP in a base solution with one additional ingredient (an acid, solvent, or other ingredient). The results, other than for Solution 29 (picolinic acid) show a synergy with MMPP, when the results are compared to other results (not shown).

TABLE 1

| Part 4 | | | | | | | | | | |
|---|---|---|---|---|---|---|---|---|---|---|
| INGREDIENT | 32 | 33 | 34 | 35 | 36 | 37 | 38 | 39 | 40 | 41 |
| Bio-Soft S-101 | | | | | 0.25 | | | | | |
| Stepanate SXS | | | | | 0.5 | | | | | |
| Dequest 2010 | | | | 0.5 | | | | — | 0.5 | |
| Dowanol TPM | | | | | 3.5 | | | | | |
| Akypo LF-2 | 1 | | | | — | | | | | |
| Gallic acid | — | 1 | | | | — | | | | |
| Butyl lactate | | — | 4 | | | | — | | | |
| Lactic acid | | | — | 1 | | | — | | | |
| Multitrope 1214-LQ-(MV) | | | — | | 1 | | — | | | |
| Dimethyl succinate | | | | — | | 5 | | — | | |
| Sensiva SC 50 | | | | | — | | 0.3 | | — | |
| Zinc sulfate heptahydrate | | | | | | — | | 1 | | — |
| Omnia | | | | | | — | | | 1 | — |
| Triacetin | | | | | | — | | | | 5 |
| MMPP | | | | | 2 | | | | | |
| KOH/Ptsa | | | | | pH to 2.4 | | | | | |
| DI Water | | | | | q.s. to 100 | | | | | |
| Spore Log$_{10}$ Reduction in 3 minutes | 2.42 | 0.96 | 4.77 | 1.73 | 1.85 | 3.91 | 1.81 | 0.68 | 2.76 | 3.31 |

Solutions 32-41 show the effect of combining MMPP in the base solution with one additional ingredient (acid, solvent, surfactant, or antimicrobial metal salt). The results, when compared to other results (not shown) show a synergy with MMPP particularly for some ingredients Akypo LF-2 (alkyl ether carboxylic acid; Solution 32), butyl lactate (Solution 34), dimethyl succinate (Solution 37), Omnia (butyl-3-hydroxybutyrate; Solution 40) and triacetin (Solution 41). Solution 39 (containing a zinc salt as the added ingredient) does not contain Dequest 2010 (chelating agent) in order to prevent removal of the added zinc ions from the solution.

TABLE 1

| Part 5 | | | | | | |
|---|---|---|---|---|---|---|
| INGREDIENT | 42 | 43 | 44 | 45 | 46 | 47 |
| Bio-Soft S-101 | | | 0.25 | | | |
| Stepanate SXS | | | 0.5 | | | |
| Dequest 2010 | | | 0.5 | | | |
| Dowanol TPM | | | 3.5 | | | |
| Dowfax C-6L | 2 | | — | | | |
| Dowanol EPH | — | 3 | | — | | |
| Phenethyl alcohol | | — | 2 | | — | |
| Butyl cellosolve | | | — | 5 | | — |
| Butyl carbitol | | | | — | 5 | — |
| Biopure nC4-OL | | | | | — | 6 |
| MMPP | | | 2 | | | |
| KOH/pTSA | | | pH to 2.4 | | | |
| DI Water | | | q.s. to 100 | | | |
| Spore Log$_{10}$ Reduction in 3 minutes | 0.35 | 1.46 | 1.48 | 1.95 | 0.69 | 1.82 |

Solutions 42-47 show the effect of combining MMPP in a base solution with one additional ingredient (solvent or surfactant). The results, when compared with other results (not shown) show a synergy with MMPP in all solutions except for Solution 42 (Dawfax C-614.

TABLE 1

| Part 6 | | | | | | |
|---|---|---|---|---|---|---|
| INGREDIENT | 48 | 49 | 50 | 51 | 52 | 53 |
| Bio-Soft S-101 | | | 0.25 | | | |
| Stepanate SXS | | | 0.5 | | | |
| Dequest 2010 | | | 0.5 | | | |
| Dowanol TPM | | | 3.5 | | | |
| pTSA | 0.3 | | — | | | |
| 2,2-Bis(hydroxymethyl) propionic acid | — | 2.5 | | — | | |
| 2-pyrrolidone | | — | 2.5 | | — | |
| 5-sulfosalicylic acid *2H$_2$O | | | — | 0.7 | | — |
| Aminosyl SLMT | | | | — | 0.5 | — |
| Citric acid | | | | — | | 0.5 |
| MMPP | | | 2 | | | |
| KOH/pTSA | | | pH to 2.4 | | | |
| DI Water | | | q.s. to 100 | | | |
| Spore Log$_{10}$ Reduction in 3 minutes | 0.54 | 0.82 | 0.55 | 0.95 | 0.51 | 1.12 |

Solutions 48-53 show the effect of combining MMPP in the base solution with one additional ingredient (an acid, solvent, or surfactant). The results, when compared with other results (not shown) show a synergy with MMPP for solutions 49 (2,2-Bis(hydroxymethyl) propionic acid), 51 (5-sulfosalicylic acid*2H2O), and 53 (citric acid).

TABLE 1

| Part 7 | | | | | | |
|---|---|---|---|---|---|---|
| INGREDIENT | 54 | 55 | 56 | 57 | 58 | 59 |
| Bio-Soft S-101 | | | 0.25 | | | |
| Stepanate SXS | | | 0.5 | | | |
| Dequest 2010 | | | 0.5 | | | |
| Dowanol TPM | | | 3.5 | | | |
| Boric acid | 1 | | — | | | |

TABLE 1-continued

Part 7

| INGREDIENT | 54 | 55 | 56 | 57 | 58 | 59 |
|---|---|---|---|---|---|---|
| D-limonene | — | 0.05 | | | — | |
| Dimethyl adipate | | — | 2 | | | |
| Formic acid | | | — | 2.5 | | |
| Lignosulfonic acid | | | | — | 0.5 | — |
| Copper sulfate | | | | — | | 1 |
| MMPP | 2 | | | | | |
| KOH/pTSA | pH to 2.4 | | | | | |
| DI water | q.s. to 100 | | | | | |
| Spore Log$_{10}$ Reduction in 3 minutes | 0.59 | 0.4 | 1.34 | >5.5 | 0.54 | 0.73 |

Solutions 54-59 show the effect of combining MMPP in the base solution with one additional ingredient (an acid, antimicrobial metal salt, or solvent). The results, when compared with other results (not shown) show a synergy with MMPP for solutions 56, 57 and 59 (dimethyl adipate, formic acid, and copper sulfate, respectively).

TABLE 1

Part 8

| INGREDIENT | 60 | 61 | 62 | 63 | 64 | 65 |
|---|---|---|---|---|---|---|
| Bio-Soft S-101 | 0.25 | — | | 0.25 | | 1 |
| Stepanate SXS | 0.5 | — | | | 0.5 | |
| Dequest 2010 | | | 0.5 | | | |
| Dowanol TPM | | | | 3.5 | | |
| Phenylglyoxylic Acid | 0.5 | — | | | | |
| Sulfosuccinic acid | — | 1 | | | | |
| BTC 1210 | | — | 1 | | | — |
| Lipoic acid | | — | | 0.5 | | — |
| THPS | | — | | | 0.5 | — |
| MMPP | 2 | | | | | |
| KOH/pTSA | pH to 2.4 | | | | | |
| DI water | q.s. to 100 | | | | | |
| Spore Log$_{10}$ Reduction in 3 minutes | 0.26 | 0.72 | 0.29 | 0.2 | 0.57 | 0.41 |

Solutions 60-65 show the effect of combining MMPP in the base solution with one additional ingredient (acid, salt of an acid, or surfactant). The results for solutions 60 to 65, when compared to other results (not shown) show a synergy with MMPP for solution 61 (sulfosuccinic acid). Anionic surfactants/hydrotropes were not used in Solution 62 given that BTC 1210 contains cationic surfactants (anionics can inactivate and/or neutralize cationic surfactants through forming irreversible complexes).

Example 2

Additional solutions were prepared and tested as shown below in Table 2.

TABLE 2

| INGREDIENT | 66 | 67 |
|---|---|---|
| Citric acid | 3 | — |
| Sulfamic acid | — | 2 |
| MMPP | 2 | |
| KOH/pTSA | pH to 3.2 | |
| DI Water | q.s. to 100 | |
| Log$_{10}$ Reduction | 3.25 | 3.41 |

Solutions 66 and 67 were tested against spores, *B. subtilis*, using the ASTM E2197 test method at a contact time of 90 seconds and at a temperature of 45° C. Both solutions were found to be effective sporicides under the conditions of the test.

Example 3

Additional solutions were prepared and summarized in Table 3 below.

TABLE 3

| INGREDIENT | 68 | 69 | 70 |
|---|---|---|---|
| Bio-Soft S-101 | — | | 0.13 |
| Bioterge PAS-8S | 0.2 | | — |
| Tornadol 91-2.5 | 0.06 | | 0.2 |
| Tamisolve NxG | — | | 2 |
| Benzyl alcohol | 3.1 | 3.5 | — |
| Dowanol TPM | — | | 2.5 |
| Ethyl carbitol | — | | 3.5 |
| Crodasinic LC-30 | — | | 0.25 |
| Glycolic acid | — | 2.15 | 2.3 |
| Salicylic acid | 0.16 | — | 0.1 |
| Furoic acid | 0.5 | — | 0.35 |
| Trilon M | 0.1 | — | — |
| Dequest 2010 | — | 0.5 | 0.3 |
| Phosphoric acid | | 0.15 | — |
| Hydrogen Peroxide | 1 | 9 | 5.4 |
| MMPP | 2 | | |
| p-TSA/KOH | pH to 2.1 | pH to 2.6 | pH to 2.3 |
| DI water | q.s. to 100 | | |
| Logic Reduction | 4.52 | >6.17 | >6.26 |

Solutions 68-70 were tested against *C. difficile* spores, using the EPA's Methods and Guidance for Testing the Efficacy of Antimicrobial Products Against Spores of *Clostridium difficile* on Hard Non-Porous Surfaces (ASTM E2197 method) with guidance from the OECD on the use of the method against *C. difficile* spores, a contact time of 5 minutes, and at room temperature. All solutions were found to be effective sporicides.

Example 4

More solutions were prepared and summarized in Table 4 below. In these solutions, deionized water was included, q.s. to 100.

TABLE 4

| INGREDIENT | 71 | 72 | 73 | 74 |
|---|---|---|---|---|
| Sulfamic acid | 2 | — | | — |
| Citric acid | — | 3 | — | |
| Glycolic acid | — | | 4.3 | — |
| Mandelic acid | | | | 3 |
| Sodium salicylate | | 0.3 | | |
| MMPP | 2 | | | |
| Stepanate SXS | 2 | | | |
| Tornadol 91-6 | 0.2 | | | |
| XFO-64 | 0.06 | | | |
| KOH | pH to 3.1 | | | |
| DI water | q.s. to 100 | | | |
| Growth results; | 1 Growth | 0 Growth | 1 Growth | 1 Growth |

Solutions 71-74 were tested using the modified AOAC 966.04 method utilizing Dacron suture loops as the carriers (average starting titer of 5.6×10$^5$ colony forming units per carrier), against *B. subtilis* spores, at a contact time of 10 minutes and at a temperature of 45° C. The results demonstrate a complete pass for Solution 72, and marginal fails for Solutions 71, 73, and 74. This does not show Solutions 71, 73 and 74 as not sporicidal but merely that these solutions did not meet the requirements of the specified test. One skilled in the art would appreciate that the three marginal failures could be mitigated by utilizing at least one of the following strategies: increasing the concentration of the synergistic additives (sulfamic acid, glycolic acid, and mandelic acid), decreasing the pH, raising the temperature above 45° C., and increasing the contact time.

Example 5

Solutions 75-78 were prepared and tested for their corrosive effect as shown in Table 5 below. Solutions 76 and 78 contain MMPP and is in accordance with the invention. Solutions 75 and 77 contain no peroxyphthalic acid or salt thereof and is therefore not in accordance with the invention.

TABLE 5

| INGREDIENT | 75 | 76 | 77 | 78 |
|---|---|---|---|---|
| Furoic acid | | 0.8 | | 2.2 |
| Dequest 2010 | | 0.8 | | 1 |
| Phosphoric acid | — | | | 0.3 |
| Cobratec 35-G | | 0.5 | | 2 |
| Sodium Molybdate | | 0.015 | | 0.01 |
| Bioterge PAS-8S | | 0.4 | | 0.4 |
| Crodasinic LS30 | | 0.3 | | 0.4 |
| Surfadone LP-100 | | 0.05 | | 0.04 |
| Ethox 3115 | | 0.1 | | — |
| Alfonic 610-3.5 | | — | | 0.05 |
| Propylene carbonate | | 0.7 | | 0.1 |
| Hydrogen Peroxide | | 5 | | 5.2 |
| MMPP | — | 2 | — | 2 |
| Brass Corrosion % Weight Loss | 0.521% | 0.431% | 0.517% | 0.152% |

Freshly polished 1"×1"×1 3/16" brass coupons were half submerged in about 50 ml of each of solutions 75-78 inside capped glass jars and were incubated in a 50° C. oven for a period of 5 hours. The pre-incubation and post-incubation weights of the brass coupons were measured after a thorough rinse and drying. Surprisingly, the brass coupons immersed in Solutions 76 and 78 exhibited far less erosion and corrosion as compared to the brass coupons immersed in Solutions 75 and 77, and also retained a portion of their initial luster. The person skilled in the art would appreciate that copper-based alloys such as brass are highly sensitive to corrosion caused by exposure to peroxyacids such as peracetic acid. Furthermore, all four solutions contain hydrogen peroxide, which is known to react with and corrode copper alloys such as brass. These results show, surprisingly, that the addition of MMPP reduced the corrosive effect of the base solutions.

Kit of Parts

According to a second aspect, the invention provides a kit of parts that can be used to make compositions according to the first aspect. One embodiment of a kit is illustrated by Tables 6A and 6B. The kit contains composition 79 (Table 6A) in a first compartment, MMPP in a second compartment, hydrogen peroxide in a third compartment, and pH adjusting agents, KOH and phosphoric acid, in a fourth and a fifth compartment, respectively, By "compartment" is meant that the components are housed separately from each other in the kit, e.g. in separate bags, containers, etc. The kit further contains instructions for making Solutions AA-AG summarized in Table 6B.

TABLE 6A

COMPOSITION 79

| INGREDIENT | AMOUNT (wt. %) |
|---|---|
| Bioterge PAS-8S | 2.11 |
| Bio-Soft S-101 | 1.11 |
| Crodasinic LS30 | 2.22 |
| Tamisolve NxG | 11.09 |
| Propylene carbonate | 2.22 |
| Glycolic acid | 8.32 |
| Dequest 2010 | 11.09 |
| Phosphoric acid | 5.55 |
| Furoic acid | 22.19 |
| Mandelic acid | 19.41 |
| DI water | 14.70 |

TABLE 6B

| Solution | Composition 79 | MMPP | $H_2O_2$ | DI water | pH | Contact Time | $Log_{10}$ Reduction |
|---|---|---|---|---|---|---|---|
| AA | 6% | 1% | 3% | q.s. to 100 | 4 | 10 mins | >6.3 |
| AB | 6% | 1% | 3% | q.s. to 100 | 5 | 10 mins | 4.3 |
| AC | 6% | 1% | 3% | q.s. to 100 | 4 | 3 mins | 1.3 |
| AD | 6% | 1% | 3% | q.s. to 100 | 4 | 10 mins | >5.3 |
| AE | 6% | 1% | 3% | q.s. to 100 | 4 | 10 mins | 5.9 |
| AF | 6% | 1% | 2% | q.s. to 100 | 4 | 10 mins | >5.1 |
| AG | 6% | 1% | 3% | q.s. to 100 | 4 | 6 mins | 5.1 |

The instructions teach making Solution AA-AG by mixing the components together with water to achieve the above concentrations, and using KOH or phosphoric acid to adjust the pH of the solutions to what is shown above.

Solutions AA-AG were tested against *B. subtilis* spores at a temperature of 45° C. using the contact times shown in Table 6B. Solutions AA, AB, and AC were tested using test method ASTM E2197. Solutions AD, AE, AF, and AG were tested using modified test method AOAC 966.04. All solutions were found to be sporicidal according to these test methods.

Example 7

Table 7 below summarizes additional embodiments of ready-to-use (RTU) solutions according to the present invention. The RTU solutions were made using ingredients of kits wherein the solid components (sulfamic acid and MMPP) and liquid components (all other ingredients except for the water) were housed separately. The kits contained instructions to mix the components of the kit together with water in the amounts indicated in Table 7 below. The instructions further called for adjusting the pH of each solution to about 3.1 using KOH. These solutions were tested and found to be sporicidal using the ASTM E2197 test method against *B. subtilis* spores at 45° C. and 10 minute contact time.

TABLE 7

| INGREDIENT | 80 | 81 | 82 | 83 |
|---|---|---|---|---|
| 200 ppm Hard Water | q.s. to 100 | q.s. to 100 | q.s. to 100 | q.s. to 100 |
| Sulfamic acid | 2 | — | — | — |
| Citric acid | — | 3 | — | — |
| Glycolic acid (70%) | — | — | 4.3 | — |
| Mandelic acid | — | — | — | 3 |
| MMPP | 2 | 2 | 2 | 2 |
| SXS | 2 | 2 | 2 | 2 |

TABLE 7-continued

| INGREDIENT | 80 | 81 | 82 | 83 |
|---|---|---|---|---|
| Tornadol 91-6 | | | 0.2 | |
| XFO-64 | | | 0.06 | |
| KOH | 1.96 | 0.5 | 0.5 | 0.14 |
| Sodium Salicylate | | | 0.3 | |

Example 8

Table 8 below summarizes additional embodiments of RTU solutions according to the invention.

TABLE 8

| INGREDIENT | 84 | 85 | 86 | 87 | 88 | 89 |
|---|---|---|---|---|---|---|
| 200 ppm Hard Water | 95.9 | 95.9 | 95.69 | 95.46 | 95.22 | 95.1 |
| Citric acid | | | 0.1 | | | |
| HEDP | | | 0.3 | | | |
| Sulfamic acid (pH to 3.0) | 0.1 | — | — | — | — | — |
| KOH (pH to 3.0) | — | 0.2 | 0.51 | 0.84 | 1.18 | 1.4 |
| Formic acid | 0.6 | 1 | 1.4 | 1.8 | 2.2 | 2.6 |
| MMPP | 3 | 2.5 | 2 | 1.5 | 1 | 0.5 |
| Spore Log$_{10}$ Reduction: | 1.89 | 2.21 | 2.36 | 2.43 | 2.19 | 1.15 |

In these solutions, sulfamic acid and KOH were used to achieve a pH of 3 in each solution. The amounts of formic acid and MMPP were varied in each solution. The greatest synergy was achieved at a weight ratio of formic acid to MMPP closer to about 1:1. All solutions were found to be sporicidal using the ASTM E2197 test method, at a contact time of 2.5 minutes, at a temperature of about 45° C., against *B. subtilis* spores.

Example 9

Solutions A-E were prepared and tested as shown in Table 9 below. These solutions are not in accordance with the present invention because they lack the peroxyphthalic acid or salt thereof.

TABLE 9

| INGREDIENT | A (wt. %) | B (wt. %) | C (wt. %) | D (wt. %) | E (wt. %) |
|---|---|---|---|---|---|
| Oxone | 2 | 2 | 2 | 2 | 2 |
| Bio-Soft S-101 | 0.25 | 0.25 | 0.25 | 0.25 | 0.25 |
| Stepanate SXS | 0.5 | 0.5 | 0.5 | 0.5 | 0.5 |
| Dequest 2010 | 0.5 | 0.5 | 0.5 | 0.5 | 0.5 |
| Dowanol TPM | 3.5 | 3.5 | 3.5 | 3.5 | 3.5 |
| Sulfamic acid | — | 2 | — | — | — |
| Mandelic acid | — | — | 1.06 | — | — |
| Benzoic acid | — | — | — | 0.25 | — |
| Glycolic acid | — | — | — | — | 2.3 |
| Deionized water | q.s. to 100 | q.s. to 100 | q.s. to 100 | q.s. to 100 | q.s. to 100 |
| pH | 2.4 | 2.4 | 2.4 | 2.4 | 2.4 |
| Spore Log$_{10}$ Reduction | 0.75 | 0.72 | 1.06 | 0.65 | 1.04 |

Solutions A to E were tested for efficacy against *B. subtilis* spores using the ASTM E2197 Standard Quantitative Disk Carrier Test Method at a contact time of 3 minutes at room temperature (18° C. to 25° C.). Solution A (a base solution containing no synergistic additives) achieved a 0.75 log$_{10}$ reduction value, solution B (containing the synergistic additive, sulfamic acid) achieved a 0.72 log$_{10}$ reduction value, solution C (containing the synergistic additive, mandelic acid) achieved a 1.06 log$_{10}$ reduction value, solution D (containing the synergistic additive, benzoic acid) achieved a 0.65 log$_{10}$ reduction value, and solution E (containing the synergistic additive, glycolic acid) achieved a 1.04 log$_{10}$ reduction value.

These results show no synergy between the synergistic additives (sulfamic acid, mandelic acid, benzoic acid, and glycolic acid) with peroxygen compound different from MMPP, namely, potassium peroxymonosulfate (Oxone, a peroxyacid salt compound).

These results are also similar to the result for solution 21 above, wherein no sporicidal synergy was demonstrated between the synergistic additive 2-furoic acid with another peroxygen compound, namely, hydrogen peroxide.

Example 10

Tests were performed to assess the stability of MMPP in aqueous solutions. Solution F was prepared by dissolving 2% wt. MMPP in deionized water, q.s. to 100. The solution was stored at room temperature and the total peroxygen content was measured at specified intervals using iodometric titrations. The results are shown below in Table 10.

TABLE 10

| | Stability Of Solution F at Room Temperature | | | | | |
|---|---|---|---|---|---|---|
| | | Day 1 | | Day 2 | Day 3 | Day 6 |
| | | Incubation Time | | | | |
| | T = 0 | T = 3 hours | T = 6 hours | T = 24 hours | T = 48 hours | T = 144 hours |
| % Total Peroxygen Content | 0.58% | 0.58% | 0.58% | 0.46% | 0.40% | 0.16% |
| % Total Peroxygen Loss | N/A | 0% | 0% | 20.80% | 31.67% | 72.08% |

Table 10 shows a rapid decline in peroxygen content in Solution F over a six day period under the conditions of this test.

Solutions G, H, I, and J were prepared as shown below in Table 11.

TABLE 11

| INGREDIENT | G | H | I | J |
|---|---|---|---|---|
| Citric acid | | | 0.1 | |
| Sodium formate | 1.5 | 2.5 | 1.5 | 2.5 |
| Dequest 2010 | | | 0.3 | |
| Sulfamic acid | 0.82 | 1.42 | 1.69 | 2.65 |
| MMPP | | | 2 | |
| 200 ppm Hard Water | | q.s. to 100 | | |

Solutions G, H, I, and J contain 2 wt. % MMPP in combination with synergistic additives, citric acid, sodium formate, and sulfamic acid. These solutions were stored in an oven at 50° C. and tested for total peroxygen content using iodometric titrations over a five-hour period. The results are plotted in FIG. 1 which shows, surprisingly, a partial stabilization of MMPP in the aqueous solutions. After about 2 hours of storage under these harsher conditions, the total peroxygen loss levelled off, which is surprising, given the comparison data in Table 10. This suggests that the present synergistic additives may also contribute to stability of MMPP in an aqueous solution.

It will be understood that the embodiments of the invention described herein are by way of example only and that modifications can be made thereto without departing from the scope of the invention herein described and claimed.

The invention claimed is:

1. An antimicrobial composition comprising,
   (a) an effective amount of at least one compound selected from the group consisting of peroxyphthalic acids and salts thereof;
   (b) an effective amount of at least one synergistic additive selected from one or more of the groups consisting of (i) formic acid, diglycolic acid, furoic acid, lactic acid, mandelic acid, phenylacetic acid, sulfosuccinic acid, and salts thereof; (ii) C6-C24 alkyl or aryl ether carboxylic acids and their salts, alkoxylated alkyl phosphoric acid esters and their salts, and glycerol ethers; (iii) benzyl alcohol, butanol, butyl carbitol, butyl cellosolve, butyl lactate, dimethyl adipate, dimethyl succinate, phenoxyethanol, ethanol, butyl-3-hydroxybutyrate, phenethyl alcohol, and triacetin; and (iv) zinc salts;
   wherein, the composition has a pH of less than about 6 when water is present.

2. The composition of claim 1, wherein the composition is free of boric acid.

3. The composition of claim 1, wherein the composition is free of inorganic halides.

4. The composition of claim 1, wherein the composition is free of vitamins.

5. The antimicrobial composition of claim 1, wherein the at least one synergistic additive comprises one or more compounds selected from the group consisting of formic acid, diglycolic acid, furoic acid, lactic acid, mandelic acid, phenylacetic acid, sulfosuccinic acid, and salts thereof.

6. The antimicrobial composition of claim 5, wherein the at least one synergistic additive comprises one or more compounds selected from the group consisting of formic acid, furoic acid, mandelic acid, and salts thereof.

7. The antimicrobial composition of claim 6, wherein the at least one synergistic additive comprises one or more compounds selected from the group consisting of formic acid and salts thereof.

8. The antimicrobial composition of claim 7, wherein the at least one synergistic additive further comprises one or more compounds selected from the group consisting of sulfamic acid, benzoic acid, glycolic acid, citric acid, and salts thereof.

9. The antimicrobial composition of claim 7, wherein the at least one synergistic additive comprises one or more compounds selected from the group consisting of capryleth-9 carboxylic acid, capryleth-6 carboxylic acid, hexeth-4 carboxylic acid, buteth-2 carboxylic acid, ethylhexylglycerin, and C8-C10 alcohol ethoxylated phosphate esters.

10. The antimicrobial composition of claim 1, wherein the at least one synergistic additive comprises one or more compounds selected from the group consisting of benzyl alcohol, butyl-3-hydroxybutyrate, dimethyl succinate, phenoxyethanol, and butyl lactate.

11. The antimicrobial composition of claim 10, wherein the at least one synergistic additive comprises one or more compounds selected from the group consisting of benzyl alcohol and butyl-3-hydroxybutyrate.

12. The antimicrobial composition of claim 1, wherein the composition comprises magnesium monoperoxyphthalate (MMPP).

13. The antimicrobial composition of claim 1, wherein effective amounts of the following synergistic additives are present:
   i. citric acid, a salt thereof, or a combination thereof;
   ii. sulfamic acid, a salt thereof, or a combination thereof;
   iii. formic acid, a salt thereof, or a combination thereof; and
   iv. capryleth-9 carboxylic acid, capryleth-6 carboxylic acid, or a combination thereof.

14. The antimicrobial composition of claim 1, wherein the at least one synergistic additive comprises one or more compounds selected from the group consisting of benzyl alcohol, phenethyl alcohol, ethanol, butanol, and zinc salts.

15. The antimicrobial composition of claim 1, wherein the composition further comprises an effective amount of at least one additional antimicrobial agent selected from the group consisting of essential oils, other alcohols, other anionic surfactants, amphoteric surfactants, quaternary ammonium compounds, phenols, aldehydes, biguanides, mineral acids, other carboxylic acids, and halogen compounds.

16. The antimicrobial composition of claim 15, wherein the other alcohols belong to the group consisting of C2 to C8 alcohols.

17. The antimicrobial composition of claim 15, wherein the at least one additional antimicrobial agent comprises at least one essential oil.

18. The antimicrobial composition of claim 1, further comprising an effective amount of at least one ingredient selected from the group consisting of allergicides, antifoaming agents, anti-pilling agents, anti-redeposition agents, antistatic agents, anti-wrinkling agents, brightening agents, buffering agents, builders, cationic surfactants, chelating agents, color protection agents, corrosion inhibitors, dyes, dye transfer inhibition agents, emulsifiers, film-forming agents, fragrances, hydrotropes, insect repellency agents, mildew removing agents, nonionic surfactants, odor capturing agents, odor removal agents, plasticizers, preservatives, radical scavengers, rheology modifiers, skin conditioning agents, softening agents, soil releasing agents, soil shielding agents, soil suspenders, souring agents, stabilizing agents, ultraviolet light protection agents, and water repellency agents.

19. The antimicrobial composition of claim 18, wherein the at least ingredient comprises at least one chelating agent.

20. The antimicrobial composition of claim 1, further comprising an effective amount of at least one pH adjusting agent.

21. The antimicrobial composition of claim 1, further comprising an effective amount of water q.s. to 100.

22. The antimicrobial composition of claim 21, wherein the composition has a pH from about 0, 0.3, 0.5, 0.7, 1.0, 1.5, or 2.0, and up to about 5.5, 5, 4.5, 4.0, 3.5, 3.0, 2.5, 2.2, 1.8, or 1.6.

23. The antimicrobial composition of claim 1 packaged in a kit of parts, wherein the kit comprises a first part containing instructions for making and using the antimicrobial composition, and at least one additional part containing components of the composition which are present together or in separate parts of the kit.

24. A method of reducing a microbial load on a surface, comprising applying an effective amount of a composition according to claim 21 to a surface containing microbes and in need of microbial reduction for a time and at a temperature effective to reduce the number of microbes by at least 1, 2, 3, 4, or 5 log 10.

25. The method of claim 24, wherein the microbes comprise bacterial spores, mycobacteria, non-enveloped viruses, prions, or combinations thereof.

26. The method of claim 24, wherein the composition is applied to an article using an automated endoscope reprocessor (AER) at a temperature ranging from about 15° C. to about 70° C.

* * * * *